(12) United States Patent
Braun

(10) Patent No.: US 9,882,643 B2
(45) Date of Patent: Jan. 30, 2018

(54) METHOD AND DEVICE FOR SETTING UP AND OPERATING A MODULAR, HIGHLY SCALABLE, VERY SIMPLE, COST-EFFICIENT AND ENDURING TRANSPARENT OPTICALLY ROUTED NETWORK FOR NETWORK CAPACITIES OF GREATER THAN 1 PETABIT/S

(71) Applicant: DEUTSCHE TELEKOM AG, Bonn (DE)

(72) Inventor: Ralf-Peter Braun, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 340 days.

(21) Appl. No.: 14/398,740

(22) PCT Filed: Dec. 27, 2012

(86) PCT No.: PCT/EP2012/077003
§ 371 (c)(1),
(2) Date: Nov. 4, 2014

(87) PCT Pub. No.: WO2013/164044
PCT Pub. Date: Nov. 7, 2013

(65) Prior Publication Data
US 2015/0117860 A1 Apr. 30, 2015

(30) Foreign Application Priority Data

May 4, 2012 (DE) .................. 10 2012 008 989

(51) Int. Cl.
*H04J 14/02* (2006.01)
*H04B 10/2575* (2013.01)
*H04B 10/27* (2013.01)

(52) U.S. Cl.
CPC ......... *H04B 10/2575* (2013.01); *H04B 10/27* (2013.01); *H04J 14/0282* (2013.01); *H04J 14/0284* (2013.01); *H04J 14/0286* (2013.01)

(58) Field of Classification Search
CPC ........... H04Q 11/0062; H04Q 11/0066; H04Q 11/003; H04Q 11/0005; H04Q 11/0003;
(Continued)

(56) References Cited

U.S. PATENT DOCUMENTS 5,077,728 A * 12/1991 Kaminow .............. H04J 14/02
398/63
6,947,670 B1 9/2005 Korotky et al.
(Continued)

FOREIGN PATENT DOCUMENTS

EP 1594241 A1 11/2005
EP 1761102 A1 3/2007
(Continued)

OTHER PUBLICATIONS

Kato K et al: "10-Tbps full-mesh WDM network based on cyclic-frequency arrayed-waveguide grating router", ECOC 2000, 26th European Conference on Optical Communication VDE Verlag Berlin, Germany, vol. 1, Dec. 2000, p. 105, XP9168986.
(Continued)

*Primary Examiner* — Hanh Phan
(74) *Attorney, Agent, or Firm* — Leydig, Voit & Mayer, Ltd.

(57) ABSTRACT

A method for setting up, operating and/or scaling a modular optically routed transport network includes: providing a quasi passive Optical Transport Network (OTN) core network according to ITU-T G.709 with N network nodes at the core network edge; providing at least one active component in each network node for the transmission of data over the core network; and changing at least one of the at least one
(Continued)

active component in at least one network node for scaling the network. The at least one active component is an optical transceiver comprising digital signal processors (DSPs).

17 Claims, 14 Drawing Sheets

(58) Field of Classification Search
CPC .... H04J 14/02; H04J 14/0282; H04B 10/032; H04B 10/038; H04B 10/035
USPC ........ 398/45, 48, 49, 33, 38, 3, 5, 2, 4, 7, 8, 398/58, 63, 79, 135, 139, 136, 141, 158, 398/159, 192, 193, 194, 83, 59
See application file for complete search history.

(56) References Cited

U.S. PATENT DOCUMENTS

| | | | |
|---|---|---|---|
| 7,184,666 B1 | 2/2007 | Li et al. | |
| 7,356,258 B1 | 4/2008 | Weverka et al. | |
| 7,415,207 B2* | 8/2008 | Lanzone | H04J 3/1611 398/46 |
| 7,532,820 B2* | 5/2009 | Aronson | H04B 10/0775 398/135 |
| 7,606,494 B1 | 10/2009 | Weston-Dawkes et al. | |
| 7,826,744 B2 | 11/2010 | Miyata et al. | |
| 7,965,911 B1 | 6/2011 | Strasser et al. | |
| 8,412,051 B2* | 4/2013 | El-Ahmadi | H04L 1/0057 398/128 |
| 9,066,160 B2* | 6/2015 | Hao | H04Q 11/00 |
| 2002/0048066 A1 | 4/2002 | Antoniades et al. | |
| 2002/0141453 A1 | 10/2002 | Ghani | |
| 2002/0165962 A1 | 11/2002 | Alvarez et al. | |
| 2002/0186432 A1 | 12/2002 | Roorda et al. | |
| 2002/0191247 A1 | 12/2002 | Lu et al. | |
| 2002/0191250 A1 | 12/2002 | Graves et al. | |
| 2003/0099014 A1 | 5/2003 | Egner et al. | |
| 2004/0042404 A1 | 3/2004 | Ravindran et al. | |
| 2005/0185961 A1* | 8/2005 | Bhalla | H04J 3/04 398/75 |
| 2005/0207756 A1* | 9/2005 | Tanaka | H04J 14/02 398/85 |
| 2007/0092248 A1 | 4/2007 | Jennen | |
| 2008/0131128 A1 | 6/2008 | Ota | |
| 2010/0098406 A1 | 4/2010 | Strasser et al. | |
| 2011/0013911 A1 | 1/2011 | Alexander et al. | |
| 2011/0135312 A1 | 6/2011 | El-Ahmadi et al. | |
| 2012/0099863 A1* | 4/2012 | Xu | H04Q 11/0005 398/49 |
| 2014/0056371 A1* | 2/2014 | Ji | H04L 27/2697 375/260 |

FOREIGN PATENT DOCUMENTS

| | | |
|---|---|---|
| WO | WO 9833287 A1 | 7/1998 |
| WO | WO 0204989 A2 | 1/2002 |
| WO | WO 02075403 A1 | 9/2002 |

OTHER PUBLICATIONS

Noguchi K et al: "Scalability of full-mesh WDM AWG-STAR network", Technical Digest, Seventh Optoelectronics and Communications Conference IEICE Tokyo, Japan, vol. 1, Jul. 8-12, 2002. pp. 72-73, XP9168987.

Kazuto N et al: "Field Trial of Full-Mesh WDM Network (AWG-STAR) in Metropolitan / Local Area", Journal of Lightwave Technology, IEEE Service Center, New York, NY, US, vol. 22, No. 2, Feb. 1, 2004, pp. 329-336, XP011109846.

Moriwaki O et al: "Full-Mesh Wavelength Channel Assignments Over Interconnected Star-Shaped Networks Employing Coprime-Channel-Cycle Arrayed-Waveguide Gratings", IEEE Photonics Technology Letters, IEEE Service Center, Piscataway, NJ, US, vol. 22, No. 5, Mar. 1, 2010, pp. 302-304, XP011302650.

Ralf-Peter Braun: "100G in the network of Deutsche Telekom", Optical Fiber Technology, vol. 17, No. 5, Jun. 23, 2011, pp. 368-376, XP028333258.

* cited by examiner

US 9,882,643 B2

METHOD AND DEVICE FOR SETTING UP AND OPERATING A MODULAR, HIGHLY SCALABLE, VERY SIMPLE, COST-EFFICIENT AND ENDURING TRANSPARENT OPTICALLY ROUTED NETWORK FOR NETWORK CAPACITIES OF GREATER THAN 1 PETABIT/S

CROSS-REFERENCE TO RELATED APPLICATIONS

This application is a U.S. National Phase application under 35 U.S.C. § 371 of International Application No. PCT/EP2012/077003, filed on Dec. 27, 2012, and claims benefit to German Patent Application No. DE 10 2012 008 989.9, filed on May 4, 2012. The International Application was published in German on Nov. 7, 2013 as WO 2013/164044 under PCT Article 21(2).

FIELD

The present invention relates to a method and apparatus or system for setting up and operating a preferably modular, highly scalable, very simple, cost-efficient and enduring transparent optically routed network (hereinafter called TOR-NET) for large network capacities, preferably network capacities of greater than 1 Petabit/s.

BACKGROUND

The capacity of optical transmission networks is increasing annually by about 40%, so that highly scalable networks have to be set up in order to be able to provide for the transmission of the capacities expected in future, too. In addition to the provision of highly scalable networks for network capacities of hundreds of Gigabit/s, these networks have also to be set up and operated very easily and cost-efficiently.

As the prior art for increasing the channel capacities and for handling such high capacities flexible elastic optical networks with variable channel grid and transmission components such as optical transmitters with variable bit rates, optical receivers with variable bit rates, optical transceivers with variable bit rates, variable optical channels, variable optical bandwidths, variable optical filters, variable optical re-configurable add-drop multiplexers, variable optical cross-connects, and the like are discussed, for example, in the publication of Schiano, Marco, et al., "*Lambda switched future photonic network development*", OFC 2012, paper OW4A.4 "and under the terms "Flex Grid" in the publication of N. Sambo, et al. "*Lightpath provisioning in wavelength switched optical networks with flexible grid*" ECOC2011, paper We.10.P1.96 or "*Elastic Optical Network*" as described in the EU project, Celtic EO-Net, http://www.celticplus.eu/Projects/Celticprojects/Call7/EO-Net/eonet-default.asp.

The communication system disclosed in U.S. Pat. No. 7,606,494 B1 describes general functions of a network architecture, but no highly scalable network architectures e.g. with AWGs (arrayed waveguide gratings).

U.S. Pat. No. 7,761,007 B2 is another example of a conventional system.

SUMMARY

In an embodiment, the invention provides a method for setting up, operating and/or scaling a modular optically routed transport network. The method includes the steps of: providing a quasi passive Optical Transport Network (OTN) core network according to ITU-T G.709 with N network nodes at the core network edge; providing at least one active component in each network node for the transmission of data over the core network; and changing at least one of the at least one active component in at least one network node for scaling the network while the quasi passive OTN core network remains substantially unchanged so as to electrically compensate for disturbances in the transmission. The at least one active component is an optical transceiver comprising digital signal processors (DSPs).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6a shows the baseband relationships of the functionalities of an AWG;

DETAILED DESCRIPTION

Figure 1:
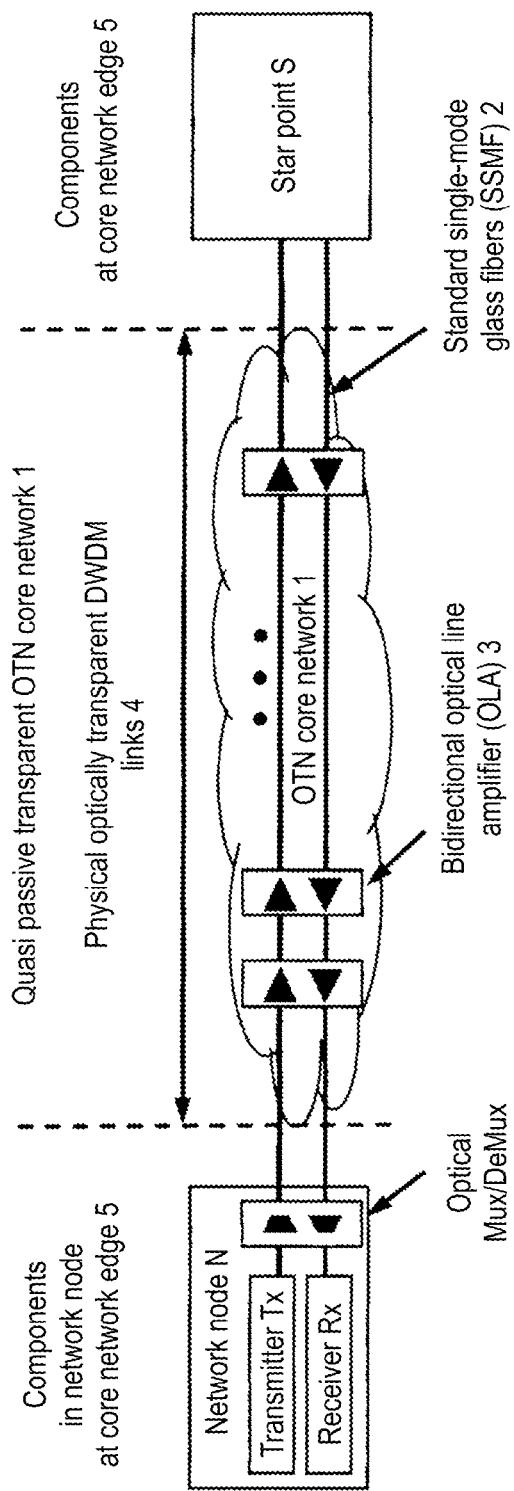
FIG. 1 shows a part of a network comprising a core network and network nodes at the core network edge.

Embodiments of the invention provide a method and a device or system for setting up and operating a preferably highly scalable, very simple, cost-efficient and/or enduring transparent optical routed network for large network capacities, preferably for network capacities of greater than 1 Petabit/s.

In particular, according to the invention variable components are dispensable in the core network such that a quasi passive optically transparent core network is sufficient which preferably substantially only comprises passive components such as glass fibers and corresponding "optical line amplifiers" (OLAs), for example at a distance of about 100 km span length. According to the invention high bit rate, for example >100 Gbit/s optically transparent DWDM (dense wavelength division multiplex) end-to-end communication channels can be provided over very large distances (e.g. >2000 km). According to the invention all other components which essentially determine the functionality of the optical transport network may be located in the network nodes at the network edge.

The present invention in particular provides for a decoupling of the quasi passive core network from the passive and/or active edge functionalities that are provided in or at the network node at the core network edge such that the core network infrastructure needs not to be changed or affected for a further scaling of the network. This enables a cost-efficient modularization and enduring scaling of the network, e.g. by installing novel components with increased spectral efficiency merely in the network nodes N such that capex (CAPital EXpenditure) and opex (OPerational EXpenditure) costs can be reduced. This modularization and/or decoupling is not provided in the flexible network concepts known, for example, from prior art.

The invention includes skillful linking and combination of different technologies, network architectures and network structures with the result of a decoupling of network elements and functionalities for the use for modularization, highest scaling of the network capacity to greater than 1 Pbit/s, simplicity and/or cost-efficiency of the network architecture and management of the network for the set up and operation of optical networks which has not been possible up to now.

For a better understanding of the present invention in the following some components, network architectures and network structures as well as aspects according to the present invention will be described by way of example and individual components and/or aspects thereof may be combined according to the invention, in order to achieve the advantages of the invention mentioned above.

Modularization

The invention provides, for example, a method and a device for the modularization of networks and network functionalities. Herein the network is preferably divided into different network areas, for example, core network, infrastructure and network nodes at the core network edge as well as metro and regional network nodes outside the core network edge. In particular, the core network connects only the core network nodes the number of which are limited, for example, to 12, see also FIG. 1. In other words, the core network is "inside" the core network edge. In contrast, metro and regional network nodes are connected to the respective core network nodes. A connection between different metro and regional nodes can be established via the corresponding core network nodes. In this context it is, for example, referred to the ITU-T recommendation G.709/Y.1331 (Interfaces for the Optical Transport Network (OTN)), in which in Figure "15-19/G.709/Y.1331—Example of TCM overhead field assignment" a subdivision in different networks is discussed. Here, in particular a network operator NO1 is shown as a Metro Area Network (MAN), NO2 as a Wide Area Network (WAN) and then a NO3 (MAN) is shown, wherein the WAN (NO2) can be interpreted in terms of a core network according to the present invention. In particular, corresponding definitions are incorporated in the present application text by reference to this document.

Moreover, reference is also made to the "Technical specification MEF4" of the Metro Ethernet Forum. In particular, a metro network of the present invention should preferably be interpreted as a metro network in accordance with this specification. Moreover, a modularization with respect to various network functionalities is possible, for example, the transparent optical fully meshed paths, which are preferably functionally separated, and thus, independent from each other. One aspect of the invention is that for changing the network capacity the core network preferable can be maintained unchanged, and merely changes at the core network edge are required. In other words, modifications at the core network edge means that changes are only necessary at the core network nodes but not on the paths between the core network nodes, i.e. the core network, preferably a quasi passive OTN core network can essentially be maintained unchanged even in case of a subsequent scaling.

Star Topology

According to the present invention a physical star network is preferred. In a star network all N network nodes are connected to a (single) star point S. The documents US 2008/0131128 and WO 98/33287 describe star topologies, however, without AWG (arrayed waveguide gratings).

In a star network the star point S may be located in one of the N network nodes, e.g. in node 7 as explained later in the detailed description with reference to FIG. 2, wherein in this case N−1 glass fiber links each preferably including 2 fibers are used in order to connect the remaining N−1 network nodes to the star point S which is located in the N-th network node. However, the star point can also be located at a location separate from the network nodes. In such a case N glass fiber links are required in order to connect all N nodes to the separate star point S (see, for example, FIG. 3).

Transparent Quasi Passive OTN Core Network

FIG. 1 shows, for example, a quasi passive transparent OTN ("Optical Transport Network") core network 1, which essentially is constructed only of standard single-mode glass fibers (SSMF, standard single-mode fiber) 2 and optical line amplifiers (OLAs) 3 and connects the network nodes N located at the edge of the core network 5. Furthermore, FIG. 1 shows a physical optically transparent connection 4 between a network node N and the star point S at the core edge network 5 via the OTN core network 1 (see, for example, ITU-T G.709, "Optical Transport Network (OTN)"). In particular, no link compensation for chromatic dispersion, mean group delay, polarization mode dispersion, or other link dispersion management is necessary.

Edge Node Functionalities

Network nodes according to the invention at the core network edge 5 may comprise passive and/or active optical and/or electrical components for the transmission as well as other components such as switches, routers and further IP-packet processing components, in particular also N×N AWGs.

Passive AWG Component

Figure 4:
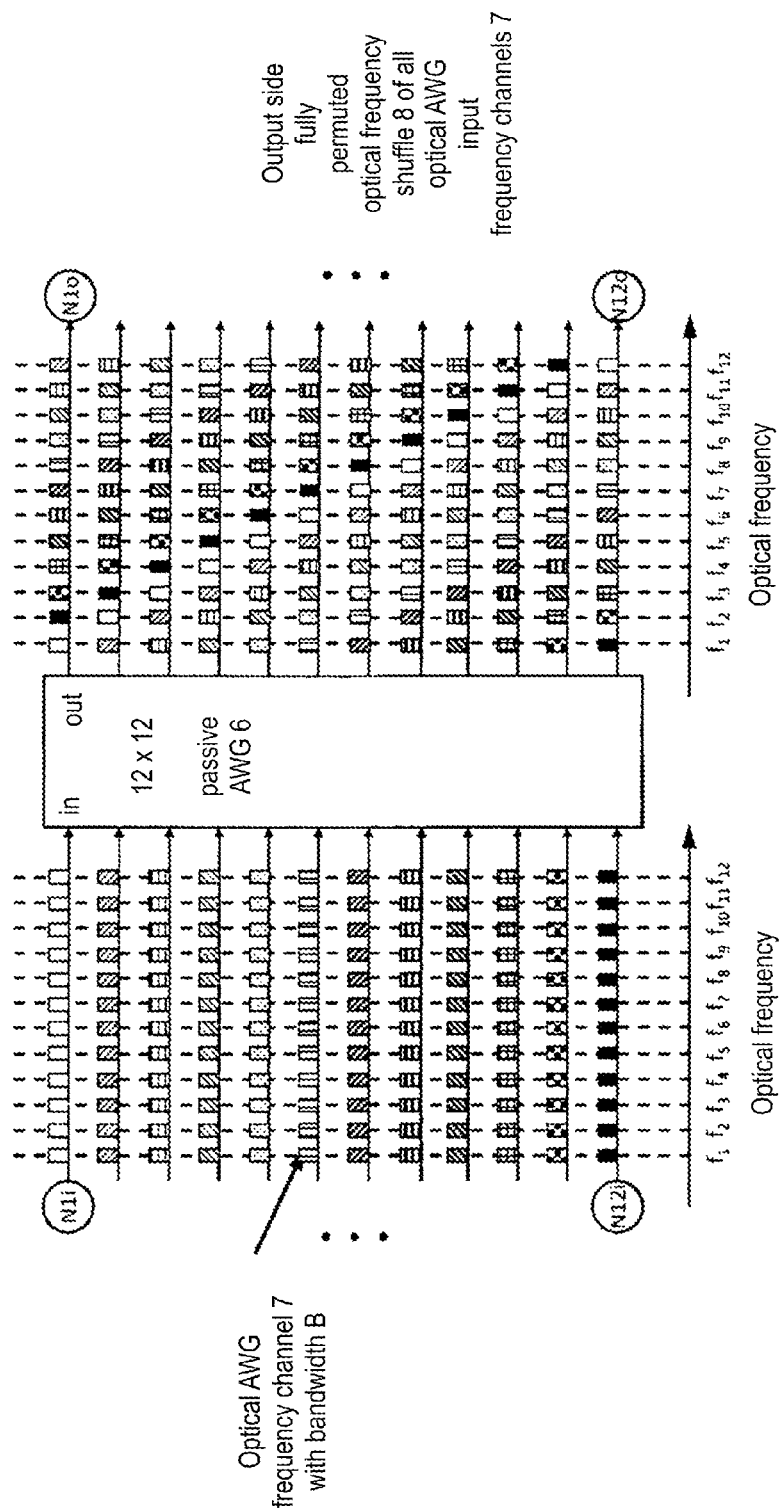
FIGS. 4 and 5 show passive optical component of a N×N port cyclic AWG.
Figure 5:
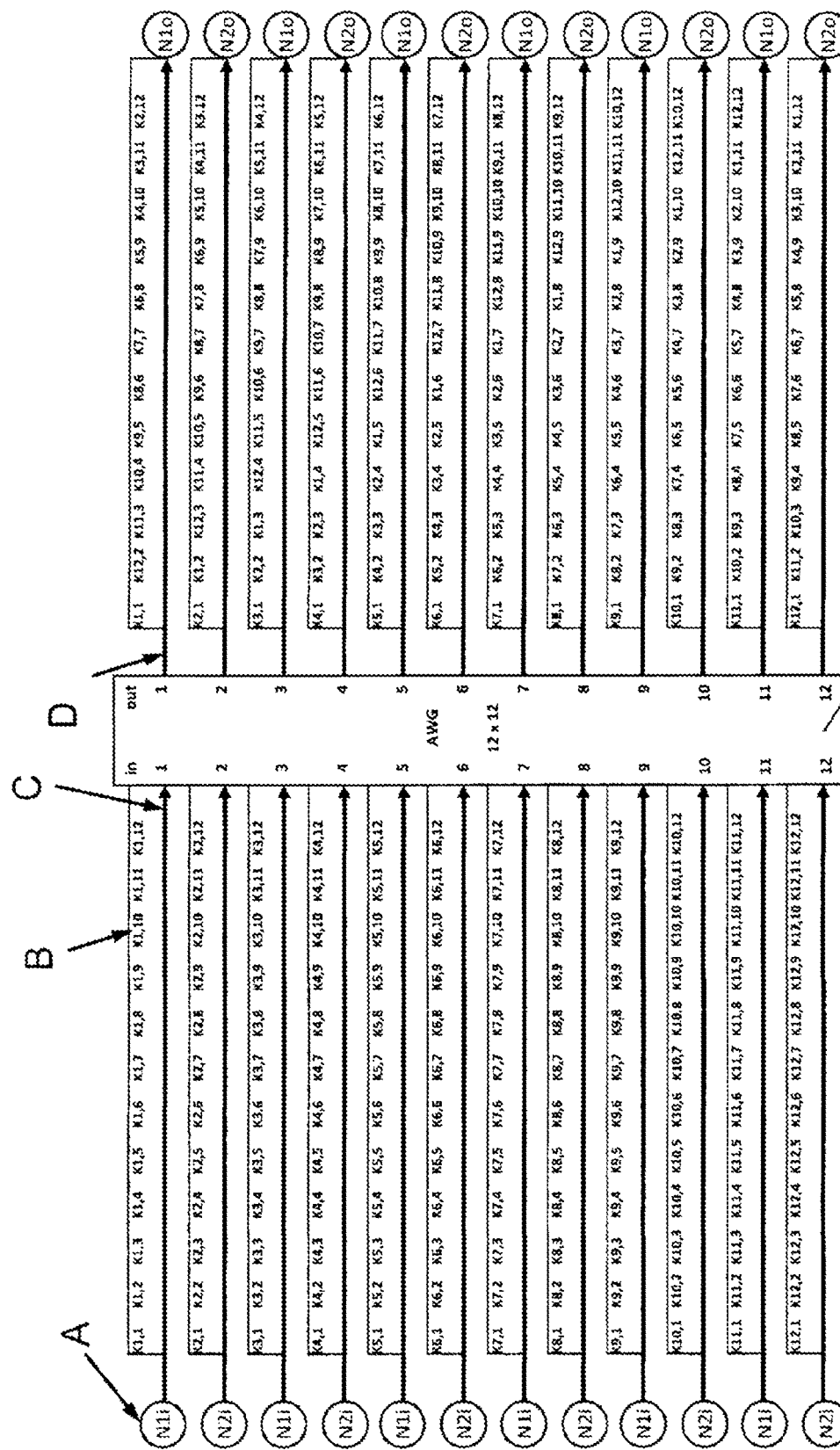

FIGS. 4 and 5 show a passive optical component of an N×N port cyclic AWG (arrayed waveguide grating) 6 which is located at the star point S and interconnects all network nodes N which are located at the core network edge 5 (here N=12). Herein, the total number of network nodes N determines the number of the N input ports and N output ports of the AWG 6. AWGs are currently used for example as low-loss N×1 multiplexers and 1×N demultiplexers in DWDM systems, wherein optical AWG frequency channels 7 on N different optical input frequencies and N different input glass fibers or input ports are routed optically passive to one output fiber while maintaining the optical frequencies.

In the patent applications EP 1761102 A1 and US 2007/0092248 interconnections of AWGs are considered which, however, differ from the present invention. The application EP 1594241 A1 discusses AWG systems for dynamically reconfigurable network topologies.

According to the present invention, however, preferably no dynamic network topologies for the application of an AWG are considered. In particular, preferably modular and independent network concepts, ranges and components, as well as the bandwidths of the AWG frequency channels and the DWDM frequency channels, the spectral efficiency of the transponders up to 7 bit/s/Hz for transparent transmission distances up to 2000 km for increasing and scaling of the transmission capacity between two nodes and for the entire fully meshed network up to greater than 1 Pbit/s for robust high bit rate transmissions of >100 Gbit/s per DWDM frequency channel are considered. In particular, according to the present invention the decoupling of the network areas and components has priority. For shorter distances the spectral efficiency can also take higher values, e.g. about 9 bit/s/Hz at <400 km (see for example FIG. 35 in the article of the reference René Jean Essiambre et al., "*Capacity Limits of Optical Fiber Networks*", Journal of Lightwave Technology, vol. 28, no. 4, Feb. 15, 2010).

Functionality of the AWGs with Respect to the Optical Frequency Domain

Figure 6:
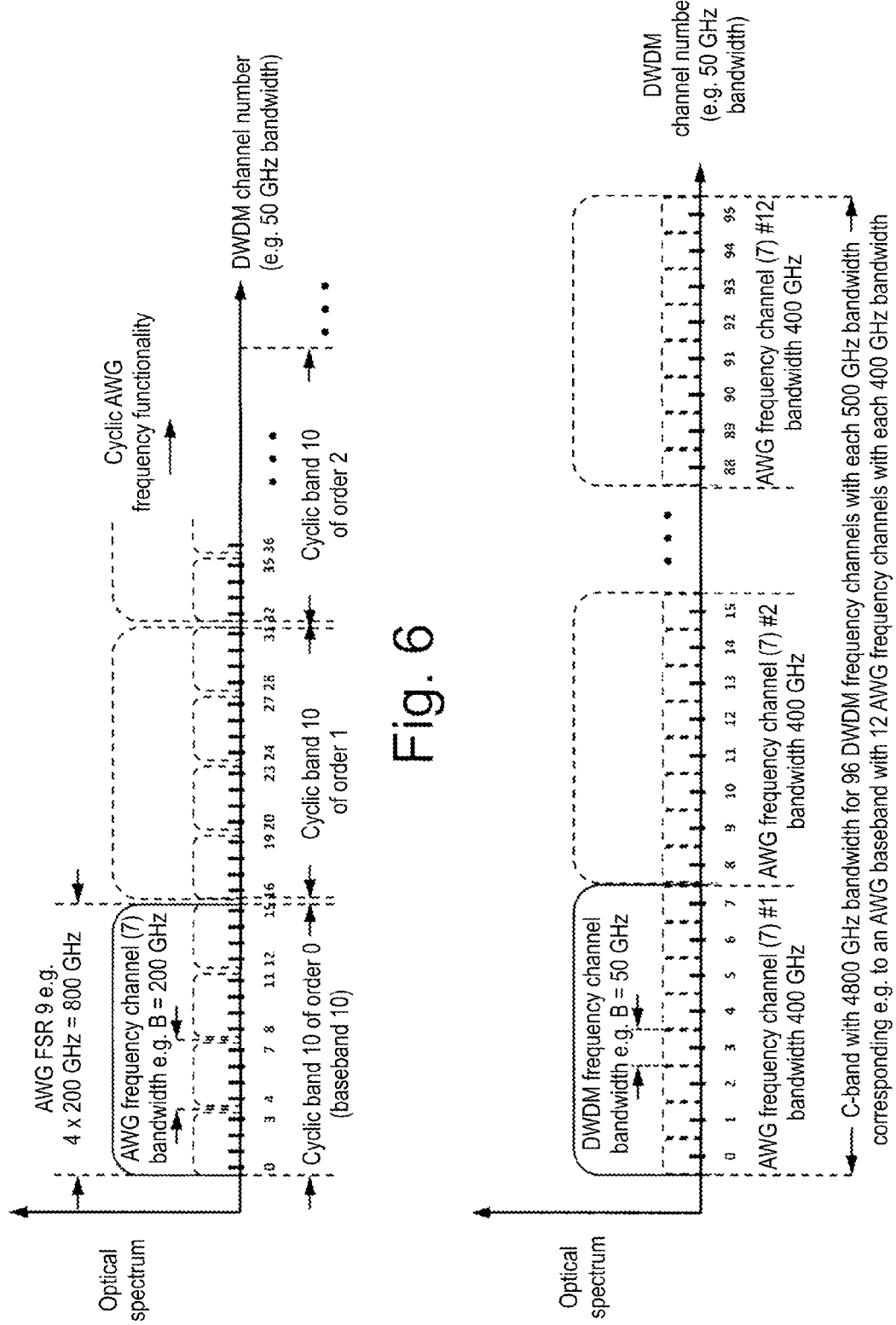
FIG. 6 shows relationships between the functionalities of a cyclic AWG.

The relationships between the functionalities of an AWG are exemplified in FIG. 6 and FIG. 6a. In particular, AWGs have a cyclic functionality with respect to the optical frequency domain which is defined by the free spectral range (FSR) 9. The free spectral range FSR, the bandwidth of the AWG frequency channels $B_{AWG-Channel}$ and the number Z of the AWG frequency channels per free spectral range FSR are in particular linked by the following equation.

$$FSR = Z \cdot B_{AWG-Channel}$$

Scalability of the Port Number of the Passive N×N AWG Component

Preferably, the parameters of the AWGs, i.e. the number of input ports, the number of output ports, the bandwidth of the AWG frequency channels, a-thermal temperature independent AWGs and the filter characteristic for the shape of the AWG filter curves, can be specifically designed/adapted according to the requirements. In particular, for AWGs the number of ports N×N, the bandwidth of the AWG frequency channels as well as the free spectral range (FSR) may be varied and chosen within wide ranges. By selecting the parameters AWGs can be adapted for various distinct cases of application. This enables a wide variety of cases of application e.g. for different node numbers.

The number N of ports of an N×N AWG, the free spectral range FSR of an AWG and the bandwidth of the AWG frequency channels $B_{AWG-Channel}$ are linked by the following equation.

$$B_{AWG-Channel} = \frac{FSR}{N}$$

As exemplified in FIG. 6a for the free spectral range FSR a slightly extended bandwidth of the optical C-band of 4.8 THz is assumed which fills the cyclic baseband of order 0. In one exemplarily supposed C-band bandwidth of 4.38 THz (100%) preferably additionally 0.42 THz bandwidth would be required (about 9.6%, i.e. 9-10%, in order to reach the 4.8 THz). Slightly extended bandwidth preferably means an extension by 1-12%, preferably 5-11%, more preferably 9-10%.

In this case, the bandwidth of the AWG frequency channels of a N×N port AWG is calculated according to the following equation:

$$B_{AWG-Channel}[GHz] = \frac{4800 \text{ GHz}}{N}$$

Thus, the entire or slightly extended C-band bandwidth (conventionally "erbium window" 1530-1565 nm with about 4.38 THz bandwidth) of approximately 4.8 THz can be utilized, such that the number of duplex AWG frequency channels and the duplex bandwidth between two nodes in dependence on the number N of network nodes or N×N AWG ports listed in table 1 are obtained. Nowadays, the parameters shown may be realized for N×N port AWGs.

In particular a DWDM system with, for example, 96 frequency channels with 50 GHz bandwidth including optical amplifiers (EDFA erbium doped fiber amplifier) is offered by Alcatel-Lucent under the product 1626 LM, however, without the use of N×N AWGs. These 4.8 THz are particularly advantageous due to 96×50 GHz, wherein in a 12 nodes core network with 1626 LM system 12×400 GHz bandwidth are available.

For N×N port AWGs even port numbers greater than N>96 are possible, e.g. even 100×100 port AWGs or beyond, such that the present invention is not limited to a certain number N of N×N AWG ports and thus node numbers in networks.

In addition, the present invention is also not limited to the optical C-band, such that the free spectral range FSR, the number of the N×N ports and the bandwidth of the AWG frequency channels may be selected within wide ranges.

Cyclic Functionality of the AWGs with Respect to the Optical Frequency Domain

As shown in FIG. 6, AWGs have a cyclic functionality with respect to the optical frequency domain which is defined by the free spectral range (FSR) 9. Thus, further cyclic frequency bands 10 with corresponding further independent fully meshed network layers for the N network nodes may be provided, whereby the network capacity may be multiplied. To this end additional optical frequency bands or wavelength bands can be used, such as the L-band (long wavelength band).

On the other hand, even only the cyclic AWG frequency baseband 10 of the order 0 of the N×N AWG, the bandwidth of which corresponds to the free spectral range (FSR) 9 of the AWG, may be used, wherein the bandwidth of the optical AWG frequency channels 7 AWG and the FSR 9 are selected and determined by the design of the AWG. In this way even in the cyclic frequency baseband 10 of the order 0 N optical AWG frequency channels 7 with a corresponding large channel bandwidth may be selected. These parameters for N×N port AWGs (number N of the nodes of the core network, number N of AWG input ports, number N of AWG output ports, free spectral range FSR 9 of the AWG, e.g. C-band, bandwidth of the optical AWG frequency channels and the number for the use of the cyclic frequency bands 10) preferably determine the architecture of the core network.

Independently therefrom other flexible functionalities may be used within the frame of the specified core network structures 1 by components in the network nodes at the core network edge 5.

L-Band Use

Use of the cyclic AWG FSR frequency functionality 8 for the extension of the usable frequency range to the L-band (optical long-wavelength band; about 1565-1625 nm), wherein for the L-band preferably enhanced OLAs (optical line amplifiers) are used such that interventions into the glass fiber infrastructure of the core network would be necessary. In addition or as an alternative for a further scaling of the network capacity also a further physical star network could be set up as exemplified in FIG. 8 and FIG. 9.

Passive Optical Routing of the AWG Frequency Channels

For the present invention preferably the functionality of the passive optical routing of the AWG frequency channels is extended to N output ports or output fibers of the AWG, so that according to FIG. 4 and FIG. 5 a full permutation of the, for example, N=12 optical AWG frequency channels 7 at the frequencies f1 to f12 on the first input fiber or input ports N1i are optically passive routed to all output ports N1o to N12o or output fibers, in particular while maintaining their optical frequencies f1 to f12.

Optical routing, however, without the use of AWGs, is, for example, discussed in the two patent documents U.S. Pat. No. 7,356,258 B and U.S. Pat. No. 7,965,911 B.

Reuse of the Optical Frequency Channels

To this end preferably a reuse of the optical frequency channels is utilized, i.e. on all input fibers or input ports and output fibers or output ports of the AWG the same frequency channels with the corresponding different DWDM channels or transmission signals are reused. Here, according to the present invention, in contrast to the method disclosed in WO 02/04989 A2 preferably no cross-connect is used.

ITU-T DWDM Grid

According to the invention preferably a fixed standardized ITU-T G.694.1 DWDM grid (see ITU-T G.694.1, "DWDM frequency grid") is used in the slightly extended optical C-band (optical conventional "erbium window" wavelength band). For example, 100 Gbit/s transmission signals can be transmitted optically transparent over a DWDM channel bandwidth of 50 GHz over more than >2000 km, such that a spectral efficiency for the transmission method of 2 bit/s/Hz is obtained. In the slightly extended C-band 96 optical DWDM channels with 50 GHz bandwidth can be optically amplified by a single OLA 3 (erbium doped fiber amplifier (EDFA)). Thus an optical bandwidth of 96×50 GHz=4800 GHz is available for transmissions per glass fiber or end-to-end DWDM link L.

Flexible Grid

Another aspect of the invention relates to the use of a flexible grid. The optical transmission bandwidth provided in the AWG frequency channels can be used optionally due to the modularity and independence of the transparent optical paths through the AWG, e.g. also by flexible components of a "flex grid" technology, such as flexible adaptive transmitters and receivers or transceivers with variable bit rates, flexible optical components such as flexible optical filters, flexible reconfigurable optical add/drop multiplexers, flexible wavelength selective switches WSS and the like (see US 2002/0048066 A1). However, according to the present invention these components are preferably used only in the network nodes at the core network edge, such that the modularity and independence between the core network and the core network edge is maintained.

Spectral Efficiency

Figure 7:
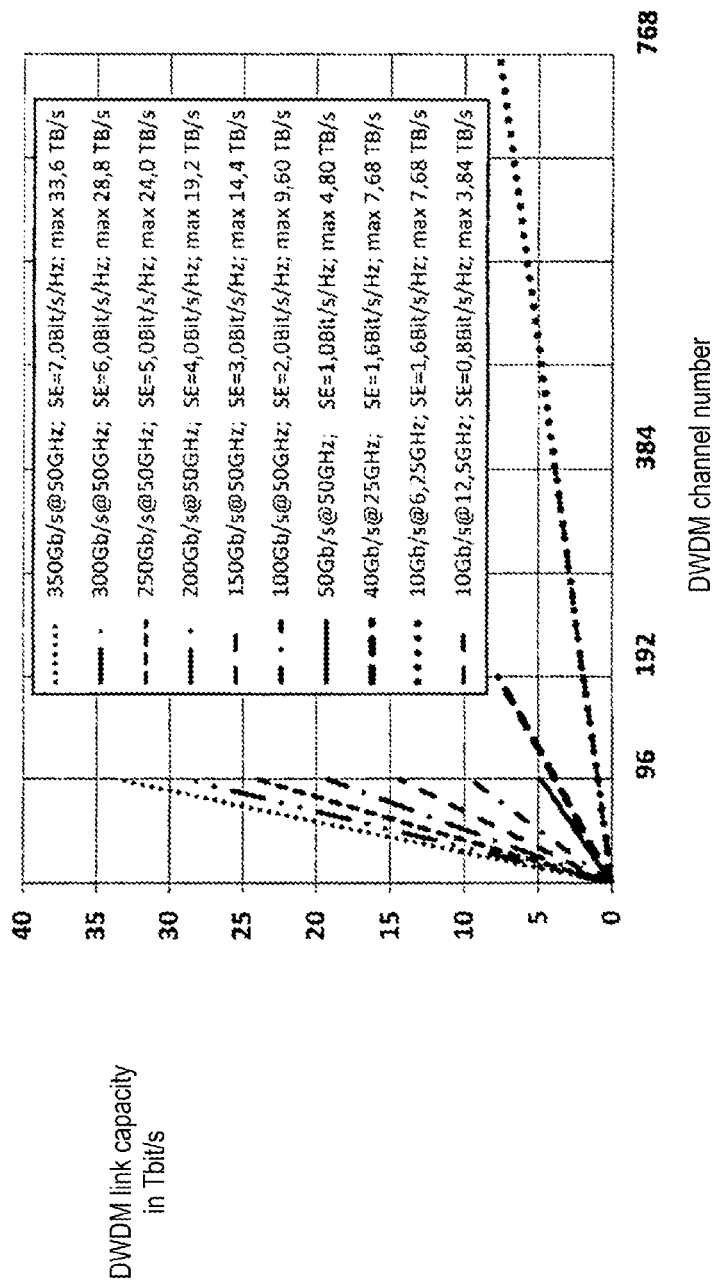
FIG. 7 shows the relationship between the DWDM link capacity in Terabit/s in dependence on the DWDM channel transmission rate and the channel frequency grid.

The increase of the spectral efficiency of transmission formats leads to a better utilization of the available bandwidth of 4800 GHz. The relation between the DWDM link capacity in Terabit/s as a function of the DWDM channel transmission rate and the channel frequency grid (frequency grid) (see ITU-T G.694.1, "DWDM frequency grid") is shown in FIG. 7. Herein, the spectral efficiency is defined by the ratio between the DWDM channel transmission rate and the available DWDM channel bandwidth and is specified in bit/s/Hz.

Through further innovations, such as increasing the multi-level modulation processes, digital signal processors in transmitters, digital signal processors in receivers, and the like the spectral efficiency (SE) is also increased, wherein the optically transparent range of the DWDM channels is greater than >2000 km. Again, it should be noted that these further innovations are preferably only used in the network nodes at the core network edge, such that the modularity and independence between the core network and the core network edge is maintained.

For example, DWDM channel transmission rates of 200 Gbit/s were demonstrated with multi-level modulation methods in DWDM channel bandwidths of 50 GHz over distances of greater than >2000 km, such that a spectral efficiency of 4 bit/s/Hz has been demonstrated (see Jianjun Yu, et al., "*Field Trial Nyquist-WDM Transmission of 8×216.4 Gb/s PDM-CSRZ-QPSK Exceeding 4 b/s/Hz Spectral Efficiency*", OFC 2012, post deadline paper PDP5D.3).

With increasing spectral efficiency, however, the required optical signal-to-noise ratio (OSNR) becomes greater and the range of the optically transparent transmission distance decreases. This situation is described by the Shannon limit. In addition, the OSNR can not be increased arbitrarily by the optical input powers, since the transmission is then limited by optical non-linearities. Thus, for a transparent transmission distance of 2000 km a maximum spectral efficiency of about 7 bit/s/Hz is obtained (see René Jean Essiambre, Gerhard Kramer, Peter J. Winzer, Gerard J. Foschini, Bernhard Goebel, "*Capacity Limits of Optical Fiber Networks*", Journal of Lightwave Technology, vol. 28, no. 4, Feb. 15, 2010, pp. 662-701).

Scalability of DWDM Link Capacity

According to the prior art 96 DWDM channels each with 50 GHz bandwidth can be transmitted together over a standard single-mode fiber (SSMF) and can be amplified by optical line amplifiers (OLA, EDFA) (e.g. Alcatel-Lucent 1626 LM system). Thus, the available bandwidth is 4800 GHz or 4.8 THz.

Thus, the DWDM link capacity in the C-band as a function of the spectral efficiency (SE) is 4800 Gbit/s×SE or 4.8 Tbit/s×SE.

Thus, with spectral efficiencies of SE=1 bit/s/Hz to SE=7 bit/s/Hz the following DWDM link capacities, in particular for distances of more than 2000 km, can be achieved:

Spectral efficiency 1 bit/s/Hz ⇨ Link capacity: 4.8 THz×1 bit/s/Hz=4.8 Tbit/s

Spectral efficiency 2 bit/s/Hz ⇨ Link capacity: 4.8 THz×2 bit/s/Hz=9.6 Tbit/s

Spectral efficiency 3 bit/s/Hz ⇨ Link capacity: 4.8 THz×3 bit/s/Hz=14.4 Tbit/s

Spectral efficiency 4 bit/s/Hz ⇨ Link capacity: 4.8 THz×4 bit/s/Hz=19.2 Tbit/s

Spectral efficiency 5 bit/s/Hz ⇨ Link capacity: 4.8 THz×5 bit/s/Hz=24.0 Tbit/s

Spectral efficiency 6 bit/s/Hz ⇨ Link capacity: 4.8 THz×6 bit/s/Hz=28.8 Tbit/s

Spectral efficiency 7 bit/s/Hz ⇨ Link capacity: 4.8 THz×7 bit/s/Hz=33.6 Tbit/s

Because to this end only the transmitter and receiver components have to be inserted or replaced into the network node at the core network edge 5 (the core network may be maintained unchanged), the invention described herein is future-proof, highly scalable and very cost-efficient for the network set up with corresponding "capex" costs and for the operation with corresponding "opex" costs. Moreover, significantly higher spectral efficiencies can be achieved, however, with a corresponding decrease of the range. Thus, according to the state of the art the interfaces with SE>7 bit/s/Hz can no longer optionally be used up to 2000 km, but are usually dependent on the transmission distance.

Scalability of the Network Capacity

If, for example, a core network with 96 nodes and a 96×96 port AWG are assumed, then 96×95/2=4560 optical DWDM links with each 50 GHz bandwidth are obtained for a fully meshed network structure. With spectral efficiencies of SE=1 bit/s/Hz to SE=6 bit/s/Hz the following network capacity of partially larger >1 Pbit/s are achieved Spectral efficiency 1 bit/s/Hz ⇨ Network capacity: 4560× 50 GHz×1 bit/s/Hz=0.228 Pbit/s Spectral efficiency 2 bit/s/Hz ⇨ Network capacity: 4560× 50 GHz×2 bit/s/Hz=0.456 Pbit/s Spectral efficiency 3 bit/s/Hz ⇨ Network capacity: 4560× 50 GHz×3 bit/s/Hz=0.684 Pbit/s Spectral efficiency 4 bit/s/Hz ⇨ Network capacity: 4560× 50 GHz×4 bit/s/Hz=0.912 Pbit/s Spectral efficiency 5 bit/s/Hz ⇨ Network capacity: 4560× 50 GHz×5 bit/s/Hz=1.140 Pbit/s Spectral efficiency 6 bit/s/Hz ⇨ Network capacity: 4560× 50 GHz×6 bit/s/Hz=1.368 Pbit/s Spectral efficiency 7 bit/s/Hz ⇨ Network capacity: 4560× 50 GHz×7 bit/s/Hz=1.596 Pbit/s Preferably here the interfaces can be used optionally and independently of the distance up to 2000 km because the SE is only considered up to 7 bit/s/Hz, which are valid for up to 2000 km.

In the present invention by use of a cyclic N×N AWG a simple network architecture is considered, in contrast to the method described in EP 1761102 A1 and U.S. Pat. No. 6,947,670 B1 in which complicated node architectures are considered.

Full Mesh on the Optical Frequency Domain

The same principle also applies to the other input and output ports of the AWG, such that e.g. with only N=12 reusable optical AWG frequency channels 7 a full mesh with N×(N−1)=132 simplex, i.e. only in one direction, or N×(N−1)/2=66 duplex transmission channels, i.e. forward and return channels, may be provided in the optical domain. All together the 12 glass fibers each having 12 optical frequency channels can provide 12×12=144 optical AWG frequency channels 7. That is, at the output side a fully permuted optical frequency shuffle 8 of all optical AWG input frequency channels 7 is provided, such that on the optical frequency domain a fully meshed network can be provided between all network nodes.

However, for full mesh 12 frequency channels that are routed onto themselves, are not taken into account. Thus, with a single N×N AWG 6 with N input ports and N output ports on N reusable optical AWG frequency channels 7 with a bandwidth $B_{AWG\text{-}Channel}$ of the AWG frequency channels a fully meshed network for N network nodes with a total of N×(N−1)/2 independent duplex transmission channels, i.e. forward and return channels, can be provided.

Bandwidth and Capacity of the Transparent Node-to-Node Path

The bidirectional bandwidth $B_{Node\text{-}to\text{-}Node}$ between two arbitrary nodes provided in the present invention by a N×N AWG is essentially determined by the number N of network nodes or ports of the N×N AWG, the bandwidth $B_{AWG\text{-}Channel}$ of the AWG frequency channels and the number ZY of the used cyclic FSR bands as $$B_{Node\text{-}to\text{-}Node} = ZY \times B_{AWG\text{-}Channel}$$

The number of duplex AWG frequency channels and the bandwidth between two nodes, which are provided in a fully meshed network by a N×N AWG, for an AWG free spectral range FSR=4.8 THz (extended C-band), are summarized in table 1 in dependence on the number N of network nodes or N×N AWG ports.

In particular, this node-to-node bandwidth can be used by flexible components with variable frequency allocation or by allocation of fixed ITU-T DWDM frequency grids, wherein in both cases the components are located in the nodes at the core network edge and are independent of the passive core network.

The node-to-node capacities $C_{Node\text{-}to\text{-}Node}$ are determined not only by the provided bandwidth $B_{Node\text{-}to\text{-}Node}$ of the node-to-node paths but in addition by the spectral efficiencies (SE) of the transmitters and receivers in the network nodes at the core network edge, which are individually provided independently by flexible bitrate adaptive or fixed bitrate constant transceivers for the corresponding bandwidths. The capacity $C_{Node\text{-}to\text{-}Node}$ between two nodes is calculated as $$C_{Node\text{-}to\text{-}Node} = B_{Node\text{-}to\text{-}Node} \times SE$$

For spectral efficiencies of 1 bit/s/Hz to 7 bit/s/Hz depending on the bandwidth of the AWG frequency channels over the N×N AWG port according to table 2 capacities of 0.050 Tbit/s to 11.2 Tbit/s are obtained for the transparent paths between 2 nodes. Because all node-to-node connections are independent from each other by means of the full mesh of the network by transparent optical links, the transceivers and, thus, the spectral efficiencies and thus also the node-to-node capacities can be freely selected for the individual paths, wherein, however, the optical frequencies for the corresponding paths are fixed.

Bandwidth and Capacity of the Fully Meshed Network

The bidirectional bandwidth $B_{Full\ Mesh}$ of a fully meshed network provided in the present invention by a N×N AWG is determined by the number N of network nodes or ports of the N×N AWG, the bandwidth $B_{AWG\text{-}Channel}$ of the AWG frequency channels and the number ZY of used cyclic FSR bands as $$B_{Full\ Mesh} = ZY \times N \times \frac{N-1}{Z} \times B_{AWG\text{-}Channel}$$

The corresponding number of duplex AWG frequency channels as well as the network bandwidth which are provided in a fully meshed network by a N×N AWG for a AWG free spectral range FSR=4.8 THz are summarized in table 3 in dependence on the number N of network nodes or N×N AWG ports.

In particular, this width of the fully meshed network may be used by means of flexible components with variable frequency allocation or by allocation of fixed ITU-T DWDM frequency grids, wherein in both cases the components are located in the nodes at the core network edge and are independent of the passive core network.

The capacity of the fully meshed network $C_{Full\ Mesh}$ is determined not only by the provided bandwidth of the fully meshed network $B_{Full\ Mesh}$ but in addition by the spectral efficiencies (SE) of the transmitters and receivers in the network nodes at the core network edge which are individually provided independently by flexible bitrate adaptive or fixed bitrate constant transceivers for the corresponding bandwidths. The network capacity of the fully meshed network is calculated as $$C_{Full\ Mesh} = B_{Full\ Mesh} \times SE$$

For spectral efficiencies of 1 bit/s/Hz to 7 bit/s/Hz in dependence on the number of network nodes and the corresponding bandwidth of the AWG frequency channels over the N×N port AWG according to table 4 and table 2 capacities of 4.8 Tbit/s up to 1596 Tbit/s=1.596 Pbit/s are obtained for the transparent paths of the fully meshed network. Because all node-to-node links are independent from each other by means of the full mesh of the network by transparent optical links, the transceivers and, thus, the spectral efficiencies, and thus also the node-to-node capacities can be freely selected for the individual paths, wherein, however, the optical frequencies for the corresponding paths are fixed.

Robust High-Speed Transmission

Preferably, a robust high-speed transmission can be achieved by use of optical transceivers with digital signal processors (DSP) to compensate for disturbing influences of the glass fiber transmission for high bitrate signals in the transmitter and/or receiver in an electronic way. Thus, robust transmissions with plug & play functionality are possible, wherein preferably no DWDM link compensations or dispersion management for chromatic dispersion, mean group delay or polarization mode dispersion, and the like are needed.

High Speed, Such as 100 Gbit/s, Transceiver

State of the art are 100 Gbit/s transceivers according to the OIF 100G Ultra Long Haul DWDM Framework Document http://www.oiforum.com/public/documents/OIF-FD-100G-DWDM-01.0.pdf which specifies a "dual polarization quadrature phase shift keying (DP QPSK) modulation with a coherent receiver" . . . "and digital signal processing (DSP)" within the receiver. Thus, a robust transmission with a spectral efficiency of 2 bit/s/Hz is possible, such that 100 Gbit/s transmission capacity in an optical ITU-T DWDM channel with 50 GHz optical bandwidth over a distance >2000 km can be transmitted optically transparent (see René Jean Essiambre, Gerhard Kramer, Peter J. Winzer, Gerard J. Foschini, Bernhard Goebel, "*Capacity Limits of Optical Fiber Networks*", Journal of Lightwave Technology, vol. 28, no. 4, Feb. 15, 2010, pp. 662-701). These high speed transceivers according to the invention are preferably used in corresponding packet processing switches and/or routers in the network nodes, so that preferably further transponders can be avoided (see US 2011/0013911 A1 and US 2010/0098406).

Range of the Transparent Transmission

Preferably, optical transmissions with ranges of >2000 km are realized over optically transparent uncompensated DWDM channels. This functionality is provided for example by the transceivers described above, wherein, for example, 40 Gbit/s and 100 Gbit/s transceivers are available. In particular, there is a dependency between the achievable spectral efficiency and the achievable transparent optical transmission distance. As already discussed above, the achievable spectral efficiency for a DWDM glass fiber transmission without dispersion compensation is approximately 7 bit/s/Hz.

Application of the Invention is Possible in Many Countries

The inventive modular subdivision into a core network with corresponding network nodes at the core network edge enables the set up of the inventive core networks 1 in many countries, in particular even in areas in which the national transparent optical transmission distances are greater than >2000 km, wherein the spectral efficiency and the transmission distances have to be tuned. Already now much greater distances than 2000 km can be achieved with transmission capacities of 40 Gbit/s and even 100 Gbit/s.

Future-Proof Network Scaling

Since the transceivers according to the invention are used in the network nodes at the core network edge 5 they are independent of the quasi passive core network, so that further technology innovations, such as increased spectral efficiency for multi-level modulation formats and/or increasing the transmission ranges may be applied directly and independently. Thus, with the present invention the networks can further be scaled in their capacity easily and cost-efficiently and future-proof without changing or affecting the OTN core network.

Independence from OTN Core Network and Edge Node Functionalities

Due to the preferred independence of the fixed quasi passive core network 1 from the flexible functionalities in the network nodes at the core network edge 5 a modular network structure or network architecture can be set up. In this way functionalities are separated, whereby manufacturer specific components can be obtained, inserted, operated and managed cost-efficiently, such that the capex and opex costs can be reduced.

Independence of the Optical AWG Frequency Channels

Due to the preferred independence of the transparent optical AWG frequency channels 7 in the fully meshed network with allocation or addressing of the optical AWG frequency channels 7 or the optical DWDM channels which determines the route through the core network 1 or the destination node N in the core network, many other advantages are achieved, such as the modularization, the independent use of various technologies of different manufacturers, the independent scaling of the individual end-to-end optical AWG frequency channels 7 or DWDM channels in the fully meshed network 1, independent monitoring of the individual end-to-end connections in the fully meshed network 1, fast and accurate fault detection of the individual end-to-end DWDM channels and the optical AWG frequency channels 7 in the fully meshed network 1, independent backup connections of the individual end-to-end DWDM channels and the optical AWG frequency channels 7 in the fully meshed network 1, individual, independent and need-based scalability and extension of each individual end-to-end DWDM channel and the optical AWG frequency channels 7 in the fully meshed network 1, and the like.

No Further Functionalities in the Core Network

According to the invention described herein complex, flexible and/or active network components in the core network are dispensable due to the preferred full mesh of the transparent optical end-to-end connections, such as optical add/drop multiplexers (see US 2002/0141453 A1 and U.S. Pat. No. 7,184,666 B1), reconfigurable flexible optical add/drop multiplexers (ROADM) (see U.S. Pat. No. 7,184,666 B1), optical flexible cross-connects (OXC), optical switches (see WO 02/075403 A1), flexible wavelength selective switches (WSS), flexible optical filters, transit nodes (see US 2002/0186432 A1) with flexible functionalities, transit IP routers, label switched routers, transit switches, transit MPLS switches or routers, and the like.

Reducing the Costs Per Gbit/s for the Core Network Infrastructure

Since preferably no further components except standard single-mode fibers (SSMF) and optical in-line amplifiers (OLAs) are used in the core network the number of components and thus also the infrastructure costs for the set up (capex) and operation (opex) of the core network are minimized, such that the costs per Gbit/s are effectively reduced.

Network Security

Figure 9:
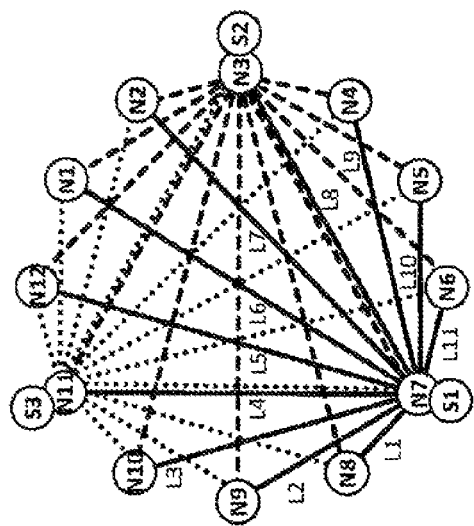
FIG. 9 shows a star network with three redundant star points S1, S2 and S3.
Figure 8:
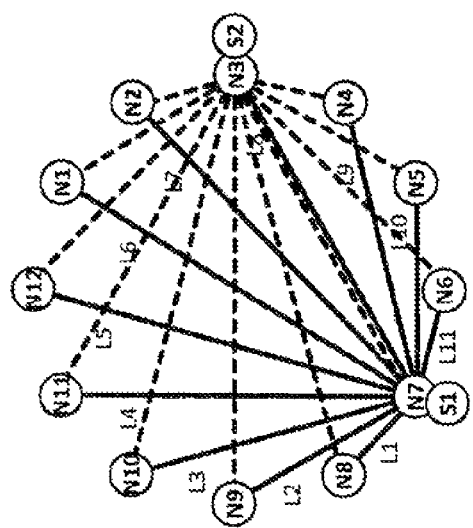
FIG. 8 shows a star network with two redundant star points S1 and S2.

The network security (resilience) is possible and reasonable by the redundant and disjointed set up of a second subnetwork, as shown for example in FIG. 8, or even further subnetworks, such as a third subnetwork shown in in FIG. 9, by means of the method underlying the present invention, wherein the redundant star points may be positioned at any locations in the network topology, in particular, for example, at strategically meaningful points in different network nodes, such that e.g. the latency period of the transmission signals in the working paths can be minimized. By setting up additional subnetworks, for example, simultaneously occurring multiple faults can be counteracted, too.

Working Paths and Backup Connection Paths

The free and independent allocation of end-to-end working paths for each node link in the fully meshed network can be selected e.g. according to the minimum length, and thus the shortest latency period of the transmission signals, in order to minimize the latency period of the working paths. End-to-end backup connection paths, such as may be provided by redundant and disjoint subnetworks (see for example FIGS. 8 and 9) could have larger lengths and latency periods compared to the working paths.

Due to the independence of the different redundant star networks and all fully meshed end-to-end AWG frequency channels preferably all connections can be managed individually and independent from each other through the allocation of adequate optical frequencies, in particular also backup connections in case of fault.

AWG Redundancy

In addition to the set up of further subnetworks with corresponding AWGs in further star points according to the invention the AWGs can be protected individually by arranging a further AWG in parallel to the AWG to be protected. The incoming optical signals on the N incoming glass fibers are divided e.g. by N broadband optical 3 dB splitters onto two glass fibers and simultaneously supplied to the two AWGs. The outgoing optical signals on the N outgoing glass fibers of the AWGs are recombined e.g. through N broadband optical 3 dB couplers with e.g. respectively N optical fiber switches for one AWG, i.e. 2×N optical fiber switches before the recombination, and switched onto the output fibers to the individual network nodes. However, herein only signals of one of the two AWGs are switched to the output fibers. Herein, the recombination may for example be implemented by N optical 2-to-1 switches.

In particular, the redundant AWGs can also be provided at different locations. If a fault occurs with respect to the active AWG, it is possible to switch to the redundant AWG very quickly within milliseconds.

If several AWGs are present in redundant star points, each AWG can be protected by a redundant AWG, as described herein.

Fault Scenarios

If a fault occurs in a network, then immediately and without great management effort the fault cause and the cause and location of the fault can be deduced preferably by individual monitoring individual, preferably all optical AWG frequency channels or the DWDM channels switched thereover.

In the following various fault scenarios are discussed on the following basis: there is provided a network with N=12 nodes and two redundant physical star topologies with full mesh on the optical frequency domain according to the method according to the present invention (see e.g. FIG. 8). By means of the N=12 present nodes a maximum of 96/12=8 independent fully meshed networks each with 12×11/2=66 optical paths with bandwidths of 50 GHz can be provided in parallel. Thus a maximum of 66×8=528 optical working paths can be provided.

In the first subnetwork the first AWG is located e.g. in node 7 which functions as the first star point. In the second subnetwork the second AWG is located in node 3 which functions as the second star point. The working paths are selected such that the lowest latency period for the transmission signals is obtained, i.e. working paths are switched both in the first subnetwork and in the second subnetwork and the backup connection paths are provided in the corresponding other subnetwork.

Each AWG frequency channel and each DWDM channel switched thereover is preferably monitored separately. The following fault scenarios and corresponding measures for troubleshooting can be considered:

Fault scenario 1: The AWG in the first subnetwork in node 7 fails whereby a maximum of 8×66 (8×12×11/2=8×66=528) optical working paths with corresponding AWG frequency channels over the star point in node 7 are affected.

Troubleshooting 1.1: Backup switching to a redundant AWG in the same star point in node 7, wherein everything else remains unchanged.

Troubleshooting 1.2: All affected optical working paths with corresponding AWG frequency channels over the star point in node 7 are switched to the backup paths over the AWG in the redundant node 3, further activities, e.g. protection of further optical signals which may have been switched to DWDM channels over the backup paths are also possible (see for example FIG. 8).

Fault scenario 2: Network node 7 as the star point fails, such that a maximum of 8×66=528 optical working paths with corresponding AWG frequency channels over the star point in node 7 are affected.

Troubleshooting 2: All maximum 8×66=528 affected optical working paths with corresponding AWG frequency channels over the star point in node 7 are switched to the backup paths over the AWG in the redundant node 3. Other activities, such as protection of further optical signals which may have been switched to DWDM channels over the backup paths are also possible.

Fault scenario 3: Bidirectional failure of the fiber pair link between node 1 and star point node 7 in the first subnetwork, wherein a maximum of 8×1 I=88 working paths of the 8×66=528 AWG frequency channels of the maximum 8-fold fully meshed network are affected.

Troubleshooting 3: All affected optical working paths with the corresponding AWG frequency channels of node 1 are backup switched over the redundant glass fiber link between node 1 and the redundant star point in node 3, further activities, e.g. protection of further optical signals which may have been switched to DWDM channels over the backup paths are also possible.

Fault scenario 4: Unidirectional failure of the fiber pair link between node 1 and the star point node 7 in the first subnetwork, wherein a maximum of 8×11=88 working paths of the 8×66=528 AWG frequency channels of the maximum 8-fold fully meshed network are affected.

Troubleshooting 4: The same process as for troubleshooting 3 is implemented.

Fault scenario 5: Simultaneous failure of the fiber pair link between node 1 and the star point node 7 and between node 1 and the star point 3, wherein a total of 8×11=88 working paths of the 8×66=528 AWG frequency channels of the maximum 8-fold fully meshed network would be affected.

Troubleshooting 5: Node 1 is completely optically isolated due to both fault cases that have occurred simultaneously. The isolation of node 1 can not be repaired by backup connections. Here only the set up of a third subnet with a corresponding star point and AWG would enable a further backup connection, as shown for example in FIG. 9.

Fault scenario 6: Failure of a DWDM interface (DWDM channel #2) in node 2 such that only one DWDM channel is affected independently from all other DWDM channels. This is a failure in network node 2 at the core network edge, which due to the independence has no affect on the core network.

Troubleshooting 6: In the core network no backup connections have to be implemented, since all AWG frequency channels work unimpaired. The fault recovery takes place only via the corresponding backup connection for the signal of the faulty DWDM interface for channel #2 in the corresponding network nodes, which terminate the faulty DWDM channel. In particular, the faulty DWDM channel is routed optically transparent through the core network, and is thus independent of the other DWDM signals, so that there is no further influence.

Fault scenario 7: Simultaneous failure of two DWDM interfaces (DWDM channel #2 and DWDM channel #3) in node 1, such that only two DWDM channels are affected independently of all other DWDM channels. This means that failures are present in the network node 1 at the core network edge, which due to the independence have no influence on the core network.

Troubleshooting 7: In the core network no backup connections have to be implemented, since all AWG frequency channels work unimpaired. The fault recovery takes place only via corresponding backup connections for the signals of the faulty DWDM interfaces for the DWDM channels #2 and #3 in the corresponding network nodes that terminate the faulty DWDM channels. In particular, the faulty DWDM channels are routed optically transparent through the core network and are thus independent of the other DWDM signals, such that there are no other influences.

Fault scenario 8: Simultaneous failure of a DWDM interface (DWDM channel #2) in the network node 1 and a DWDM interfaces (DWDM channel #3) in the network node 2, such that only two DWDM channels are affected independently of all other DWDM channels. Thus, there are two failures simultaneously in network node 1 and in network node 2 at the core network edge, which due to the independence have no influence on the core network.

Troubleshooting 8: In the core network no backup connections have to be implemented, since all AWG frequency channels work unimpaired. The fault recovery takes place only via corresponding backup connections for the signals of the faulty DWDM interfaces for the DWDM channels #2 and #3 in the corresponding network nodes that terminate the faulty DWDM channels. In particular, the faulty DWDM channels are routed optically transparent through the core network and are thus independent of the other DWDM signals, such that there are no other influences.

Flat IP Network Structures

If the fully meshed, optically passive routed transparent end-to-end paths are used for connecting IP routers and Ethernet switches in the network nodes, 1-hop connections and thus a flat IP or Ethernet network structure are provided for the IP and Ethernet layers. Thus, no transit IP routers or Ethernet switches are necessary, so that the routing tables of the IP routers and Ethernet switches are clear and limited. In addition, the IP routers and Ethernet switches are relieved of unnecessary transit traffics via multi-hop connections that are no longer needed.

By means of the full mesh of the IP routers or Ethernet switches the cost of routing algorithms for IP network optimization is reduced, e.g. for routed wavelength assignment RWA algorithms such that in particular complex calculations for larger networks are dispensable. Moreover, complex processes for the path search (see US 2004/0042404 A1) and recovery processes for re-configurations in the network (see US 2002/0191247 A1) can be reduced or eliminated.

Overall, less packet components are required, so that the investment-cost (capex) is reduced. Thereby, among others also the footprint and energy consumption are reduced, so that the operative expense (opex) is reduced.

Optical Frequency Control of the Components, AWG, Filter, Laser, Receiver

Because various optical components with frequency dependencies and frequency functions are used in the network concept, e.g. passive optical AWG, passive optical filters, ITU-T DWDM frequency channels, AWG frequency channels, optical transmitters (laser), optical receivers, and the like, these are preferably monitored in their optical frequencies, tuned to each other and/or regulated. The functionality of the frequency control is thus a preferred part of all frequency dependent components. In order to minimize the frequency dependence over the temperature drift different components can use corresponding compensated technologies, e.g. in particular a-thermal-AWGs having a very low frequency dependence as a function of the temperature may be employed. These technologies are known in the art, e.g. with respect to the Lacatel-Lucent DWDM system 1626 LM.

Easy Management and OAM of the Network Components

By means of the modular network set up with independent components for the core network and the nodes at the core network edge which has become possible by the present invention in particular the number of components as well as the management in particular fault and configuration management, as well as the "operation, administration, and maintenance" (OAM) of the components is significantly simplified compared to non-modular networks with dependent functionalities (see US 2003/0099014 A1 and US 2011/0135312 A1).

In particular by means of the full mesh with transparent end-to-end paths between the individual network nodes all paths can be supervised and monitored independently from each other. Herein various aspects can be supervised and monitored and corresponding actions can be derived, which are exemplarily discussed in the following.

Proactive Fault Management:

By evaluating the transmission signals, e.g. forward error correction (FEC) a degradation of corresponding channels can be detected leading to a hitless backup connection of the channel concerned in advance of a fault, such that the traffic is not interrupted and the faulty components can be replaced.

Fault Management in Case of Error:

In case of an error the fault management can directly determine the affected paths and the nature and location of the fault and initiate specific actions such as switching to backup channels. This is possible in particular by the independence of all transparent paths in the network.

Monitoring the Traffic Load of the Paths and Network Expansion:

In particular even the traffic load of all individual transparent end-to-end paths between the network nodes can be supervised and monitored. Thus, the filling degree of each node link can be determined individually, and if a threshold is exceeded each link can individually be increased in capacity.

This can for example be implemented through the use of an interface pair with higher spectral efficiency in order to increase a transmission capacity of e.g. 100 Gbit/s with the spectral efficiency of SE=2 bit/s/Hz over the same transmission bandwidth of for example 50 GHz to a transmission capacity of e.g. 200 Gbit/s with the spectral efficiency of SE=4 bit/s/Hz. In particular, it is advantageous if to this end only the two transceivers in the network nodes at the core network edge are replaced and the core network remains unaffected, i.e. preferably no further actions are required, because the plug & play transceivers preferably are self-calibrating.

Another possibility is to equip a yet unused transparent bandwidth for the corresponding node-to-node path with additional interfaces. If, for example, of the available bandwidth of the transparent AWG frequency channel of e.g. 400 GHz only a bandwidth of, for example, 50 GHz for an ITU-T DWDM frequency channel is used, wherein transceivers with a transmission capacity of e.g. 100 Gbit/s with the spectral efficiency of SE=2 bit/s/Hz are used, then through the use of the free bandwidth for example by a further 50 GHz ITU-T DWDM frequency channel another transparent path can be set up. With the two transceivers for an additional path with a transmission capacity of e.g. 100 Gbit/s with the spectral efficiency of SE=2 bit/s/Hz the original capacity of 100 Gbit/s would be doubled to 200 Gbit/s. Overall, of the available 400 GHz bandwidth (for a N=12 node network) of the AWG channel frequency only 100 GHz would be occupied, such that further increases in capacity are possible. In addition, the infrastructure of the core network is independent from this measure and not affected.

In addition, the management functionalities and the capex and opex costs are reduced by the simplified network structures resulting in cost-effective networks.

Network Expansion, Network Scaling and Network Optimization

The modularization enables a network expansion independent from the core network infrastructure as well as a scaling of the node-to-node capacities and network capacities. In particular, a need-based expansion for the required additional capacities for each of the node-to-node paths is possible independently from each other. If to this end transceivers with e.g. lower spectral efficiency are replaced by those with higher spectral efficiency, the replaced transceivers can be reused independently at another location in the network. In addition, new technology with e.g. transceivers with increased spectral efficiencies can be used independently, such that the invention preserves the investment and supports the future viability of the network.

The invention thus supports the strategies "pay as you grow", "grow as you need" and the "multi-vendor strategy." Herein, due to the transparent optical transmission and the independence of the components different technologies of different manufacturers can be employed, so that the competition increases and more cost-effective networks are obtained. By means of the modularization even different manufacturers for different components can be used, such as for optical filters and DWDM components, WSS, DWDM transceivers, and the like.

By means of the invention described herein also a network optimization is considered inherently, wherein based on measurements path capacities are only expanded where they are actually needed. Thus, the provision of unnecessary network resources is prevented.

This invention relates generally to a method for setting up, operating and scaling a modular optically routed data network or transport network comprising the steps of: providing a quasi passive and preferably fixed OTN core network with N nodes at the core network edge; providing at least one active component in each network node for the transmission of data over the core network, characterized in that at least one of the at least one active component in at least one network node is changed for scaling the network, whereas the quasi passive OTN core network essentially remains unchanged. In other words, for changing or scaling the transport network the quasi passive OTN core network is essentially remained unchanged and only parts of the network nodes or all network nodes are adapted to the change.

Preferably, the core network is configured as a star network and more preferably formed as a star network with at least one star point, wherein a star point is preferably located in a network node at the core network edge and/or a star point is located outside the network nodes.

Preferably a full mesh between the network nodes is established. The core network may additionally comprise at least one component of the following list: glass fibers such as standard single-mode fibers, SSMF, optical in-line amplifiers, OLAs and at least one AWG, arrayed waveguide grating.

Preferably, the AWG is installed in the star point and is preferably an optically passive N×N AWG such as a thermal or an a-thermal AWG.

According to a further preferred embodiment the AWG is a low-loss N×N AWG with an AWG channel frequency bandwidth. Preferably optical AWG frequency channels on N different input frequencies and N different input fibers or input ports are routed optically passive to N different output fibers or output ports while maintaining the optical frequencies.

The AWG can also be used as low-loss N×1 multiplexer and 1×N demultiplexer in DWDM, dense wavelength division multiplex, systems, wherein preferably optical N×N AWG frequency channels on N different optical input frequencies and N different input glass fibers or input ports are optically passive routed to one output fiber or one output port while maintaining the optical frequencies.

Instead of the 1×N AWG or N×1 AWG other filter elements for the multiplexer or demultiplexer functionalities for the N×N AWG frequency channels can be used.

The AWG is preferably used as a low-loss M×1 multiplexer and 1×M demultiplexer in DWDM, dense wavelength division multiplex, systems, wherein preferably optical DWDM frequency channels on M different optical input frequencies and M different input glass fibers or input ports are optically passive routed to one output fiber, while maintaining the optical frequencies. The multiplexer and/or demultiplexer can also be arranged in cascade, as shown, for example, in FIG. 10.

Instead of the 1×M AWG or M×1 AWG other filter elements for the multiplexer and demultiplexer functionalities for the DWDM frequency channels may be used.

According to a further preferred embodiment, optical paths between the network nodes, preferably all optical paths, are supervised and/or monitored independently from each other, and in case of fault preferably corrective actions are initiated, such as a proactive fault management, fault management.

Here also the black link approach ITU-T G.698.2 recommendation (see also ITU-T G.698.1, G698.2 and G698.3) can be mentioned. The black link would have to be associated to the core network, wherein the optically transparent route calibrates itself based on pilot signals such as in the Alcatel-Lucent 1626LM system. Then, independent therefrom are the plug & play transceivers that can be connected in the network nodes to the transparent "black links".

According to the invention a subsequent change or addition of additional flexible and/or active network components in the core network can be dispensed with due to the preferred full mesh of the (transparent) optical end-to-end links.

The core network can be expanded by a second, redundant, preferably fully meshed sub-core network. Moreover, independent or redundant AWGs can be provided to which it can be switched.

According to a further aspect passive and/or active optical and/or electrical components may be provided in the network node, preferably optical filters, optical switches, switches, routers and other IP packet processing components.

The present invention also relates to a network system which is constructed according to the principles outlined above or discussed below or claimed. Preferably, the network system according to the invention is constructed modularly and comprises: a quasi passive and preferably fixed OTN core network with N network nodes at the core network edge; at least one transceiver in each network node, characterized in that the network system is easily scalable and changes for scaling the network are enabled by merely modifying, retrofitting and/or replacing components in the network nodes, while the quasi passive OTN core network essentially remains unchanged.

The core network is preferably constructed as a star network with at least one star point, wherein a star point is located in a network node at the core network edge and/or a star point is located outside the network nodes.

The core network comprises at least one of the following passive optical components: glass fibers such as standard single-mode fibers, SSMF, optical in-line amplifiers, OLAs and at least one AWG, arrayed waveguide grating.

Preferably, the AWG is installed in the star point and is preferably an optically passive N×N AWG such as an a-thermal AWG.

The AWG can also be a low-loss N×N AWG with an AWG frequency channel bandwidth, wherein preferably optical AWG frequency channels on N different input frequencies and N different input fibers or input port are optically passive routed to N different output fibers or output ports while maintaining the optical frequencies.

The network nodes may comprise passive and/or active optical and/or electrical components, preferably optical filters, optical switches, switches, routers and other IP packet processing components.

FIG. 1 shows a first schematic representation of a modularization according to the invention in a core network and network nodes. For example, physical optically transparent links 4 between a network node N and the star point S at the core network edge 5 over an OTN core network 1 are displayed, wherein the core network only comprises standard single-mode glass fibers (SSMF) 2 and optical amplifiers (OLAs) 3. In particular, no link compensation for chromatic dispersion, mean group delay, polarization mode dispersion, or other link-dispersion management is required and provided.

In particular, no variable components are required in the core network, but the quasi passive optically transparent core network substantially consists only of the glass fibers and corresponding "optical line amplifiers" (OLAs) at a distance of e.g. about 100 km span length. This enables the provision of high bit rate >100 Gbit/s optically transparent DWDM end-to-end communication channels over very large distances of >2000 km.

According to the invention all other components that [actively] determine the functionality of the optical transport network may be provided only in the network nodes at the edge 5 of the network. Thus, FIG. 1 shows, for example, a transmitter Tx and receiver Rx in the network node N, wherein the combination of these two components is also referred to below as transceiver.

Figure 2:
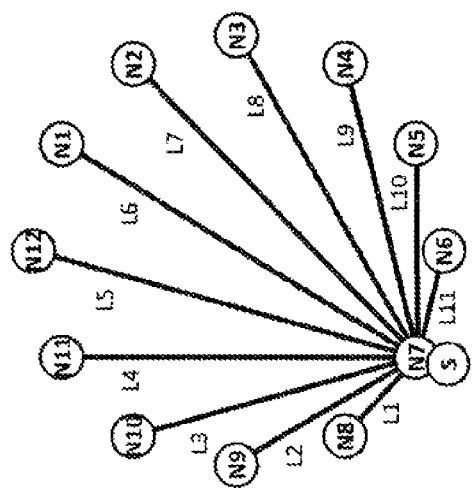
FIG. 2 shows a star network with a star point S in one of the N network nodes.

FIG. 2 shows a physical star network with e.g. N=12 network nodes N1 to N12. The star point S is located e.g. in network node N7. The star point S is connected to all other nodes via glass fiber links L1 to L11 each comprising at least one, preferably two glass fibers.

Figure 3:
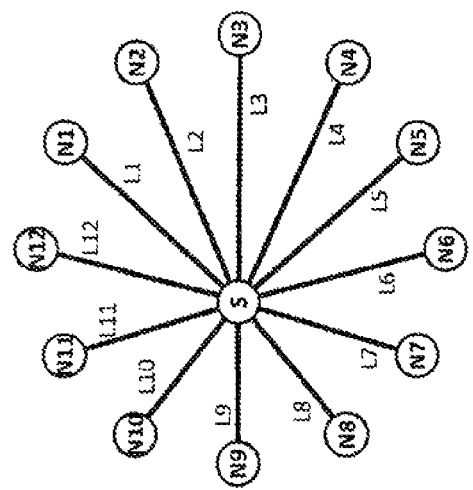
FIG. 3 shows a star network with a star point S outside of the N network nodes.

FIG. 3 shows a further physical star network according to the invention comprising e.g. N=12 network nodes N1 to N12. The star point S is located at a separate location in the network. The star point S is connected to all network nodes N1 to N12 via glass fiber links to L1 to L12 each comprising at least one, preferably two glass fibers.

FIG. 4 shows a N×N AWG with fully permuted optical frequency shuffle 8 on the AWG output ports. In particular, the permutation is graphically represented by different patterns. On the AWG output ports or AWG output fibers N1o to N12o there is provided a full permutation of the optical AWG input frequency channels 7 of the input fibers or input ports N1i to N12i. Herein, the individual optical AWG frequency channels 7 of the bandwidth are preferably exclusive passively routed through the AWG.

FIG. 5 shows an N×N AWG with fully permuted optical frequency shuffle 8 on the AWG output ports and AWG frequency channel indication corresponding to FIG. 4 for e.g. N=12.

FIG. 6 shows the functionality and the cyclic frequency response of an AWG. The free spectral range 9 FSR defines the frequency cycle of the AWG, i.e. the cyclical bands 9 of the order 0, 1, 2, . . . e.g. of a 4×4 port AWG with 200 GHz bandwidth of the optical AWG channel 7 and a FSR 9=800 GHz.

FIG. 6a shows the baseband functionality of an AWG for the example of a 12×12 AWG with 400 GHz bandwidth of the AWG frequency channels 7 and 50 GHz bandwidth of the DWDM frequency channels.

FIG. 7 shows a DWDM link capacity in Terabit/s for different transmission rates of 10 Gbit/s, 40 Gbit/s, 100 Gbit/s and 200 Gbit/s per DWDM channel and for different channel frequency intervals (frequency grid) of 50 GHz, 25 GHz, 12.5 GHz and 6.25 GHz according to the ITU-T G.694.1 standard. The different transmission rates are represented by different dashed or dot-dashed lines.

FIG. 8 shows a twofold protected physical star network with e.g. N=12 network nodes N1 to N12. The first star point S is located e.g. in network node N7. The second star point S2 is located e.g. in network node N3. There may be constructed two disjoint (separate) star networks for mutual protection. The star points S for the working paths may be independently selected according to the smallest path length between two nodes. Thus, for the backup paths the respective other star point is obtained.

FIG. 9 shows threefold protected physical star network with e.g. N=12 network nodes N1 to N12. The star points S1, S2 and S3 are located e.g. in the network nodes N7, N3 and N11. There may be constructed three disjoint star networks for mutual protection, wherein the network is also protected for failures occurring simultaneously. The star points for the working paths and backup paths can be independently selected according to the smallest path length between two nodes, wherein the length of the working paths should be smaller than the length of the backup paths.

Figure 10:
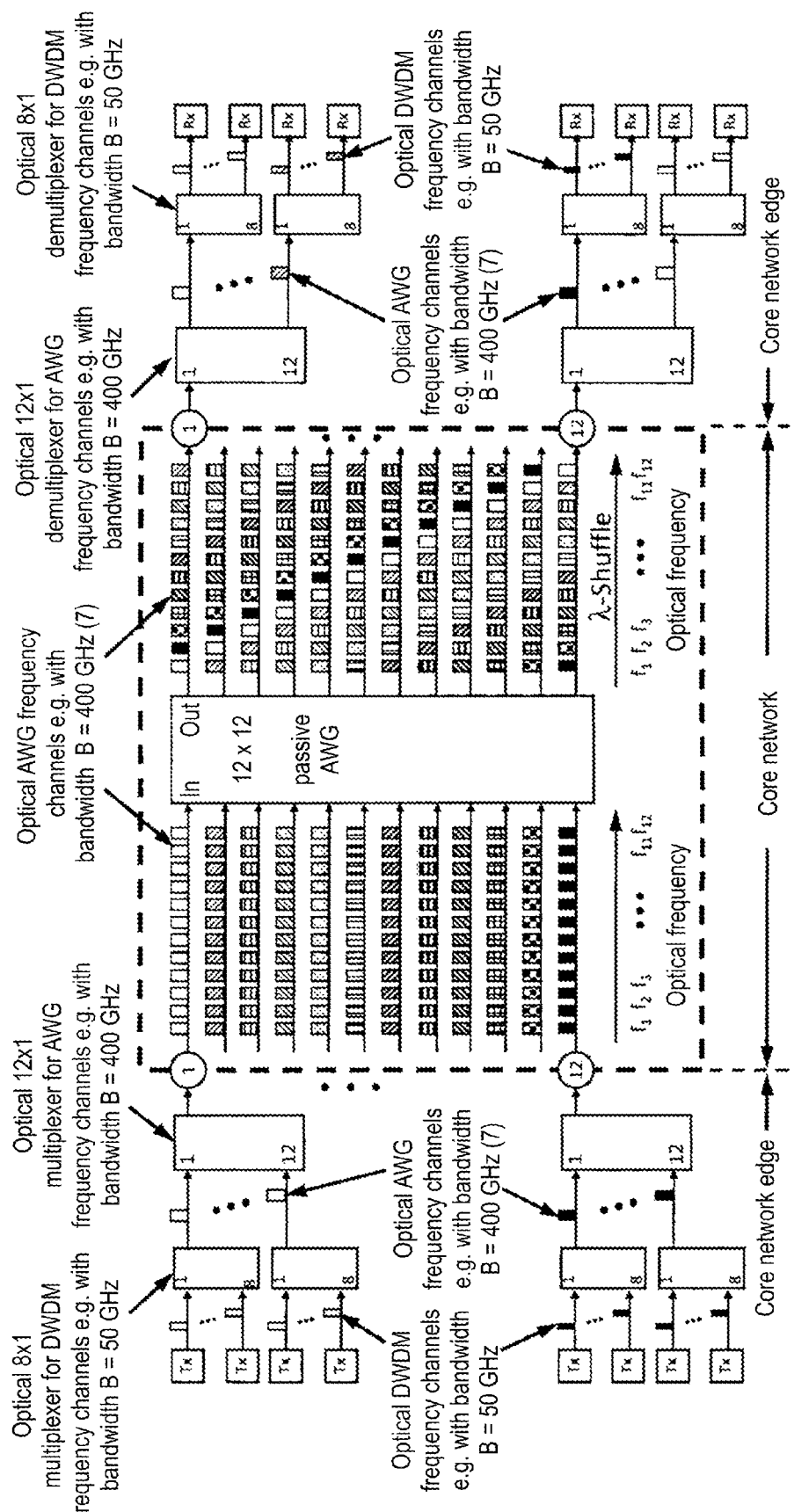
FIGS. 10-13 show example scenarios of the invention for the use of passive components at the core network edge.

FIG. 10 shows an example of a 12 node core network with passive 12×12 AWG and AWG frequency channels of bandwidth B=400 GHz and passive optical 12×1 de/multiplexer/ filter at the core network edge for separating the AWG frequency channels with bandwidths B=400 GHz and passive optical 8×1 de/multiplexer/filter at the core network edge for separating the DWDM frequency channels with bandwidths B=50 GHz. 1 AWG frequency channel with B=400 GHz carries up to 8 DWDM channels with B=50 GHz. In addition, FIG. 10 shows schematically the provision of management functionalities for the optical passive components (for example, control of the optical frequencies) and the adaptive transceivers (configuration of the optical frequency for the selection of the target node).

Figure 11:
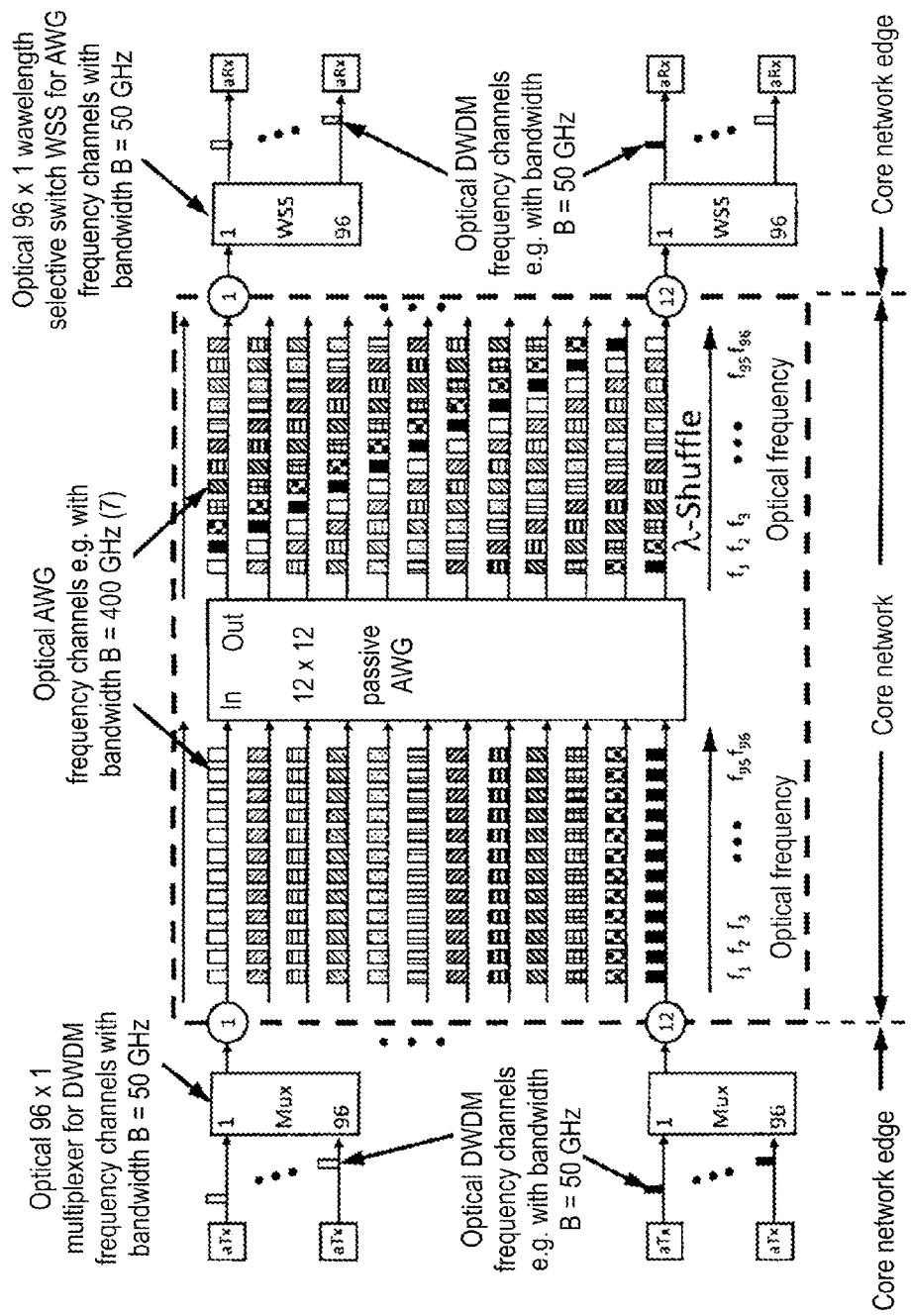

FIG. 11 shows an example of a 12 node core network with passive 12×12 AWG and AWG frequency channels of the bandwidths B=400 GHz and with transmission side adaptive transmitters (aTx) and 96:1 multiplexers at the core network edge, and with independent optical 96×96 wavelength selective switches (WSS) with fixed bandwidth B=50 GHz and flexible adaptive receivers (aRx) at the receiving side. By means of the adaptive and tuned transmitters and receivers optional transmission rates between 10 Gb/s and 350 GB/s with corresponding spectral efficiencies of 0.2 bit/s/Hz to 7 bit/s/Hz can be implemented. In addition, FIG. 11 shows schematically the provision of management functionalities for the optical passive components (e.g. control of the optical frequencies), the WSS and the adaptive transceivers (configuration of the optical frequency and the WSS ports).

Figure 12:
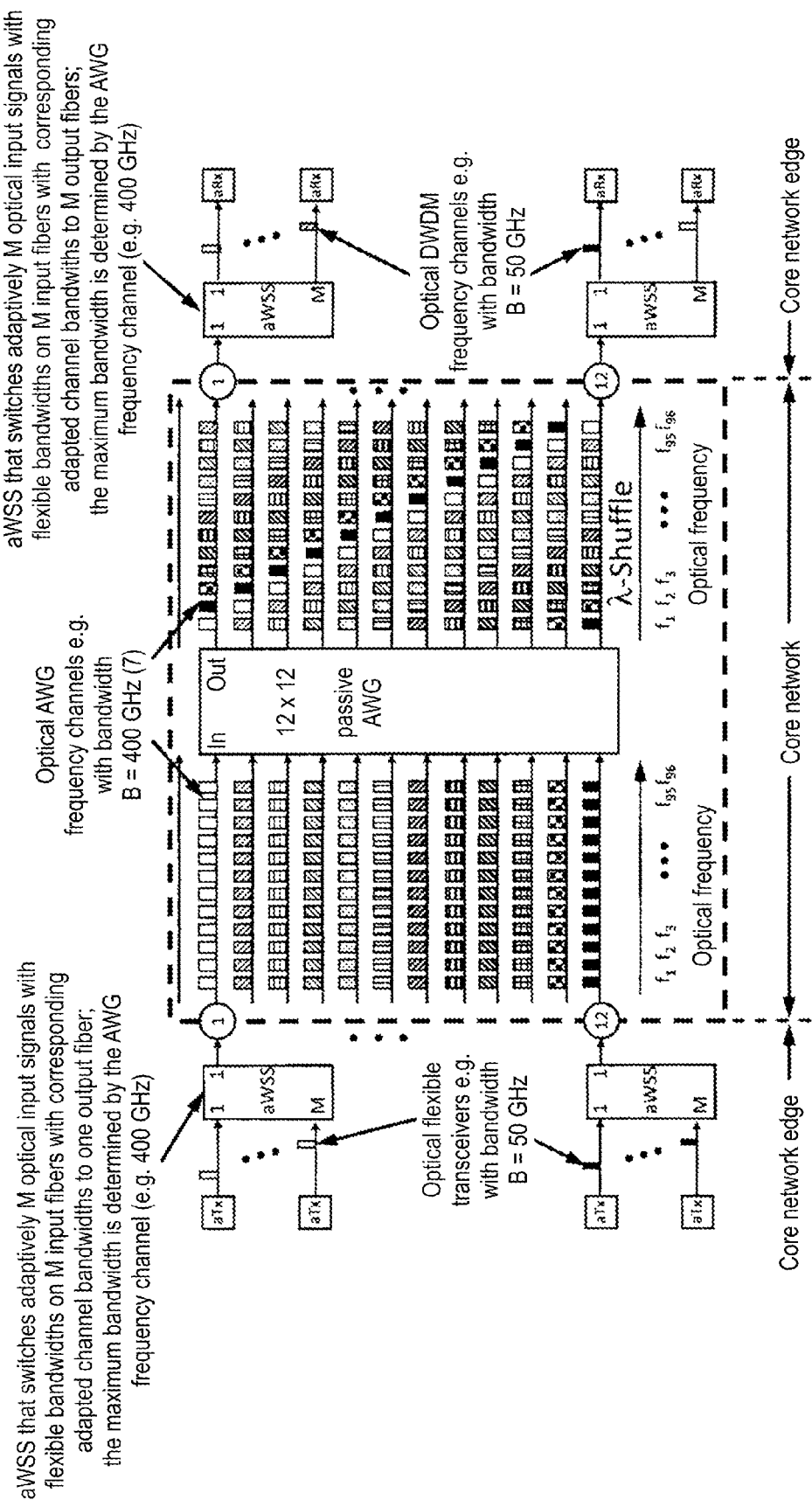

FIG. 12 shows an example of a 12 node core network with passive 12×12 AWG and AWG frequency channels of the bandwidth B=400 GHz and with adaptive transmitters (aTx) and M:1 adaptive aWSS at the core network edge at the transmission side and with adaptive receivers (aRx) and 1:M aWSS at the receiving side; the transmission or receiving side adaptive WSS can combine (M:1) and split (1:M) M different optical signals on the M input and output fibers, respectively, with different adaptive bandwidths. The bandwidths of the aWSS channels are thereby adjusted to the bandwidths of the adaptive optical transmitters and receivers for the required transmission bandwidths. In addition, FIG. 12 shows schematically the provision of management functionalities for the optical passive components (for example, control of the optical frequencies), the WSS and the adaptive transceivers (configuration of the optical frequency and WSS channel bandwidth and WSS ports).

Figure 13:
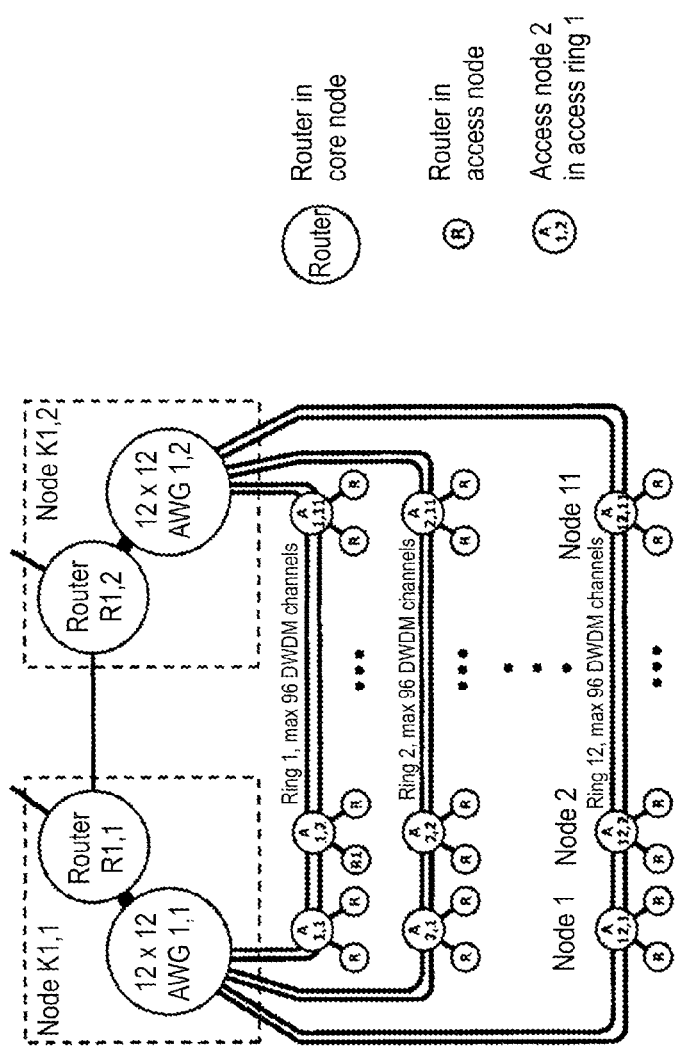

FIG. 13 shows an example for the use of N×N AWGs in two redundant core network nodes K1,1 and K1,2 for the redundant development of regio, metro, or access areas via ring structures. By means of two redundant 12×12 AWGs in the two network nodes 2 routers R1,1 and R1,2 are respectively connected to the routers R in the access node Ax,y, where y corresponds to the respective access node in ring x. The 12-th node in the access rings is e.g. the respective other core network node. Per fiber in total 12 AWG frequency channels with 400 GHz AWG frequency bandwidth are available which, for example, can be used by respectively 8×50 GHz DWDM channels. This structure can connect two redundant core network nodes to a total of 12×11=132 access nodes via 12 redundant rings with respectively 11 nodes per ring.

Figure 14:
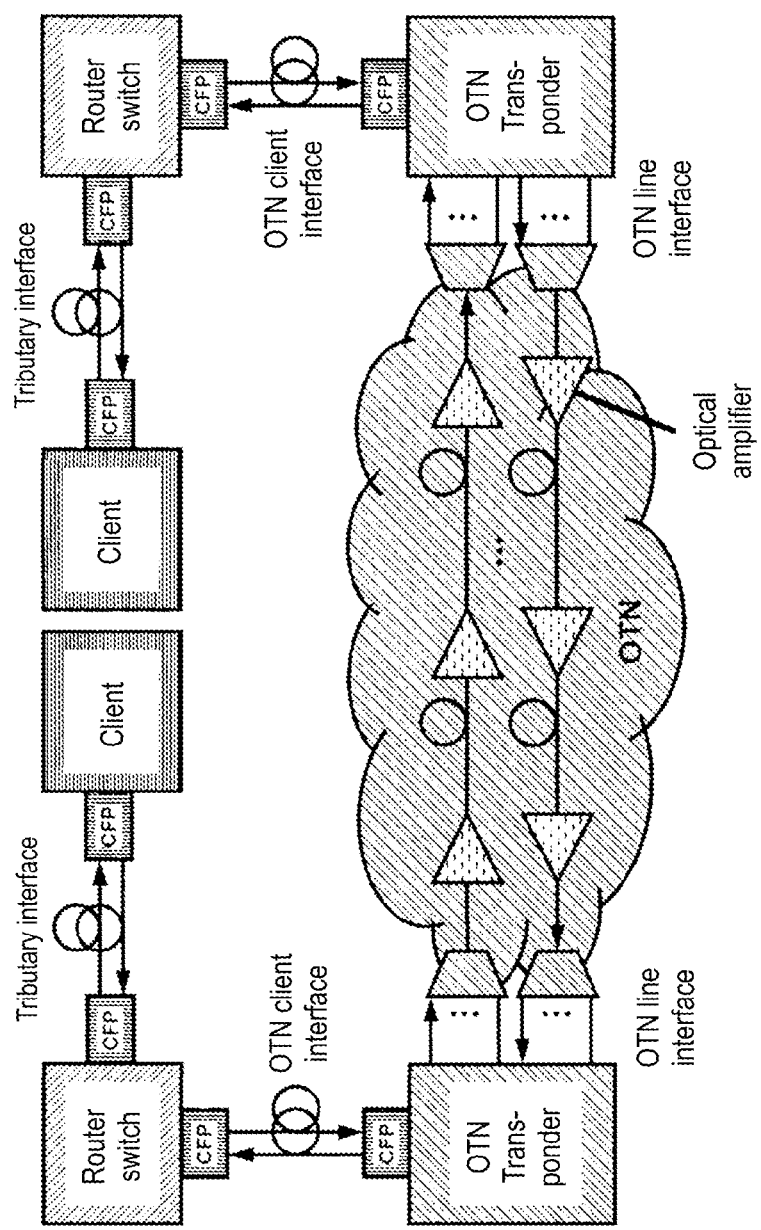
FIG. 14 is similar to FIG. 1 and shows a part of a network with a core network and network nodes at the core network edge.

FIG. 14 shows a part of a network comprising a core network and network nodes at the core network edge.

Figure 15:
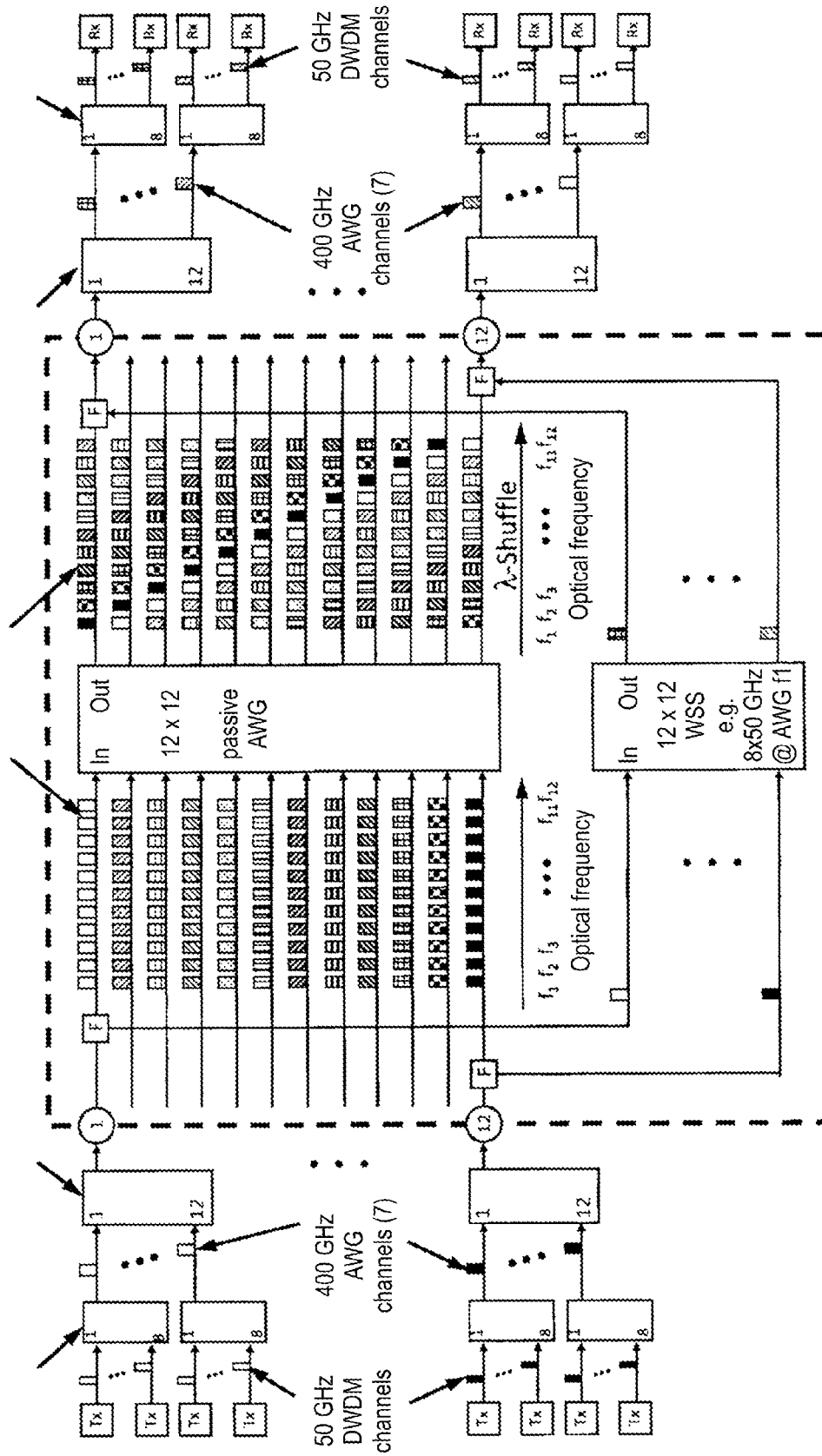
FIG. 15 shows an example scenario of the invention for the use of an active WSS in parallel to the N×N AWG at the network edge in a network node.

FIG. 15 shows the use of an active WSS in parallel to the N×N AWG at the network edge in a network node, whereby additional capacities can be switched by the WSS. Herein, the functionality of the WSS is decoupled from the functionality of the N×N AWG, and thus independent.

Figure 16:
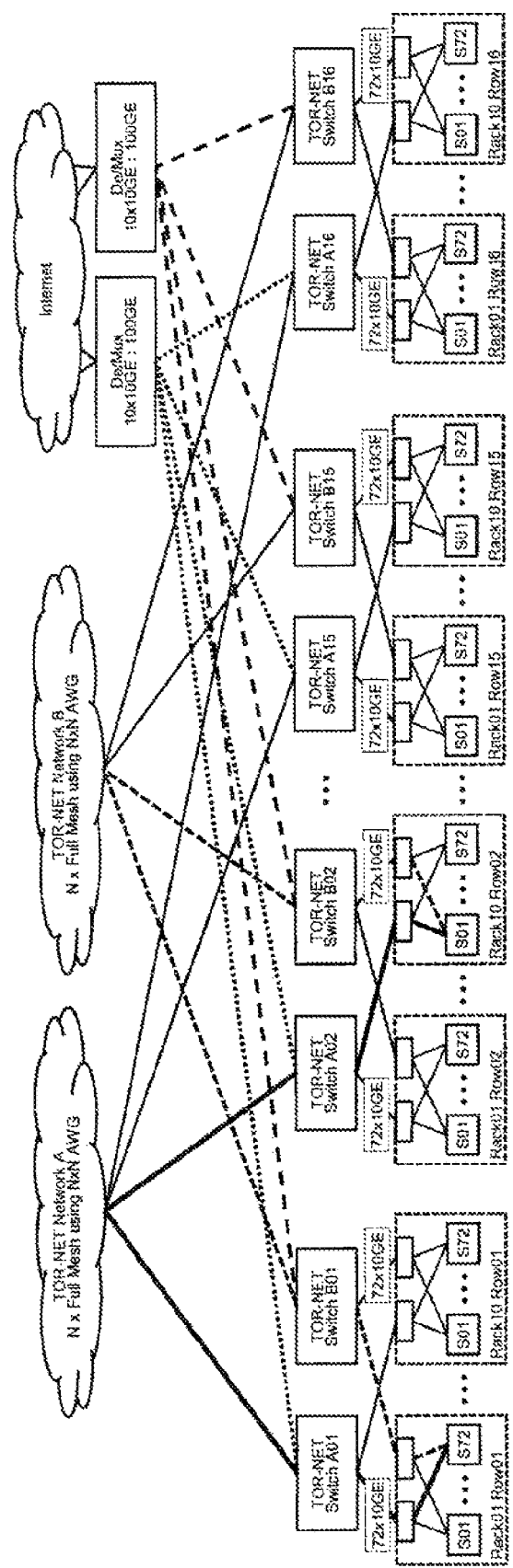
FIG. 16 shows an example scenario of the invention for the use of passive components in an optical communication network of a data center.

FIG. 16 shows the application of the invention in a data center. Through the application of the invention in a data center, for example, a tier 3 fat tree architecture is reduced to a tier 1 fully meshed transparent optical architecture for an optical communication network, wherein the "TOR-NET" switches according to the present invention are switched via the subnetworks A and B.

Finally, reference is made to the following tables 1-5 which represent the following:

Table 1: Number of duplex AWG frequency channels and bandwidth between two nodes which are provided in a fully meshed network by a N×N AWG for an AWG free spectral range FSR=4.8 THz (extended C-band) in dependence on the number N of the network nodes or N×N AWG ports.

Table 2: Node-to-node capacities in dependence on the node-to-node bandwidth (corresponding to the AWG frequency channel bandwidth) and the spectral efficiency (SE) of the transmitters and receivers in the transceivers.

Table 3: Number of duplex AWG frequency channels as well as the network bandwidth which are provided in a fully meshed network by a N×N AWG for an AWG free spectral range FSR=4.8 THz (extended C-band) in dependence on the number N of the network nodes or N×N AWG ports.

Table 4: Number of duplex AWG frequency channels as well as the network bandwidth, which are provided in a fully meshed network by a N×N AWG for AWG free spectral range FSR 4.8 THz (extended C-band) in dependence on the number N of the network nodes or N×N AWG ports.

Table 5: Crude techno-economic analysis of the example network scenario 1.

In the following examples of the network scenarios 1 to 6 of the FIGS. 10 to 13 and 15 to 16 are described once again in further detail.

Example Network Scenario 1 for the Use of Passive Components at the Core Network Edge An example scenario for the invention for the use of passive components at the core network edge is shown in FIG. 10. In the core network with 12 nodes at the core network edge only the passive 12×12 port AWG with a bandwidth of 400 GHz for the transparent optically routed AWG frequency channels 7 and the glass fiber trunks including OLAs (optical line amplifiers) connecting the AWG with the individual nodes are located.

One duplex glass fiber link for the incoming and outgoing optical signals is required for each node. On each transmission and receiving side of the nodes there are two optical filter stages. The first one consists of passive 12:1 multiplexers or 1:12 demultiplexers with a channel bandwidth of 400 GHz corresponding to the AWG frequency channel bandwidth in order to combine or to separate these 400 GHz frequency bands. Herein, for both sides the same 1:12 mux/demux functionality is provided, so that a total of 2×12=24 pieces of these 1:12 mux/demux components are necessary for a fully configured optical infrastructure. In a second filter stage the 400 GHz bandwidths available on 12 fibers can be subdivided in respectively 8 further DWDM channels with 50 GHz DWDM bandwidths. For this purpose a total of further 12×12×2=288 pieces of corresponding 1:8 DWDM mux/demux components with 50 GHz channel bandwidth are necessary for a fully configured optical infrastructure. This DWDM filter architecture is prior art and, for example, available in the 1626 LM system from Alcatel-Lucent.

For the set up of a fully meshed network with 12 nodes a total of 12×11/2=66 transparent paths are necessary, which may be switched through the provision of only 12 reusable optical frequencies provided on the different fibers. Thus, for the basic structure of a fully meshed network in total 66×2=132 transmitters and 132 receivers are necessary, which are provided by 132 transceiver modules (transmitters and receivers) with corresponding tuned or adjustable optical frequencies. If 100 Gbit/s transceivers with the spectral efficiency of 2 bit/s/Hz are provided, then a duplex node-to-node capacity of 100 Gbit/s between any two nodes and a duplex network capacity of 66×100 Gbit/s=6.6 Tbit/s is obtained for the basic configuration with 12 optical frequencies used. If all 8×12=96 optical frequencies are used, then 8 frequency domains can be set up independently from each other, whereby the duplex node-to-node capacity is increased to 8×100 Gbit/s=0.8 Tbit/s and the duplex network capacity is increased to 8×6.6 Tbit/s=52.8 Tbit/s at a spectral efficiency of 2 bit/s/Hz. A further increase of the spectral efficiency results in corresponding higher capacities, see also tables 1-4 for different values for the number of network nodes, the corresponding bandwidth of the AWG frequency bands, the corresponding number of transparent paths and the spectral efficiencies.

The free choice of the parameters in particular enables the set up of other DWDM frequency grids to set up networks with reduced DWDM channel bandwidths and increased spectral efficiencies in order to increase the network capacity.

For the components and the operation management capabilities are necessary (see US 2002/0165962 A1) e.g. for monitoring and controlling the optical frequencies for the AWG, the filter and the transceiver DWDM channel frequencies. These optical DWDM channel frequencies determine the target node and must be determined from the configuration management. The enhanced functionalities are provided in this example by the modularization and independence of the components only in the network nodes at the core network edge such that the core network is not affected or changed.

Rough Techno-Economic Analysis of the Example Network Scenario 1

If in the example network scenario 1 a length of 1000 km of all 11 fibers between the individual nodes and the central AWG in node 7 according to FIG. 2 is assumed, then for each fiber connection 9 bidirectional optical line amplifiers (OLAs) 3 according to FIG. 1 are necessary, if an amplifier spacing of 100 km is assumed. Thus in total 99 OLAs for a total of 11,000 km fiber length are necessary for the set up of the quasi passive fiber infrastructure. With the values listed in table 5 for the set up of the core network infrastructure with 1×12×12 AWGs 400 GHz, 24×1:12 mux/demux, 288×1:8 mux/demux a sum of approximately 1.6 million € excluding the fiber costs is obtained.

For a basic set up of a fully meshed network with 66 transparent paths 12 of the 96 optical DWDM frequency channels with 50 GHz bandwidth each available in the C-band and 132 transceivers are required. If for this purpose 100 Gbit/s transceivers with a spectral efficiency of 2 bit/s/Hz are used, a network capacity of 6.6 Tbit/s is obtained. The total sum for the set up of this network capacity in accordance with table 5 is about 8.2 million €. This results in a network cost factor for the basic set up of approximately 0.113 E/Gbit/km, as shown in table 5. By use of today real available prices for the corresponding components the network cost factor compared to table 5 has already been reduced to approximately 0.067 €/Gbit/km, i.e. reduced to about 60%, and this trend will continue due to the further drop in prices of the components.

Considering a complete set up, then 8 independent fully meshed subnetworks may be provided by the 8×12=96 available DWDM frequency channels in the C band. Thus, the network capacity can be increased 8-fold to 8×6.6 Tbit/s=52.8 Tbit/s. To this end, in particular only further 924 transceivers have to be added, wherein the core network remains unaffected and unchanged. The total sum for the complete set up as shown in table 5 amounts to approximately 54.4 million €. This results in a network cost factor for the complete set up of approximately 0.094 €/Gbit/km according to table 5. Here, with the use of today real available prices for the corresponding components the network cost factor has been reduced to about 0.051 €/Gbit/km compared to table 5.

Through further innovations and the annual decline in prices of components the network cost factors are continuously improved, since the network endures well over 10 years. In particular, increased spectral efficiencies can be used by future technologies with better cost factors, and this is possible only by the modularization and independence of the network structure underlying the present invention.

Example Network Scenario 2 for the Use of Partially Flexible Components at the Core Network Edge An example scenario for the invention for the use of partially flexible components at the core network edge is shown in FIG. 11.

In the core network with 12 nodes at the core network edge only the passive 12×12 port AWG with a bandwidth of 400 GHz for the transparent optically routed AWG frequency channels 7 and the glass fiber trunks including OLAs connecting the AWG with the individual nodes are located.

One duplex glass fiber link for the incoming and outgoing optical signals is required for each node.

On the transmission side of the nodes passive optical 96:1 multiplexers are disposed which are adapted to combine 96 DWDM channels with a bandwidth of 50 GHz each on one output fiber. These DWDM channels are used by adaptive transmitters which can be controlled in their frequency and e.g. also in their spectral efficiency. This allows establishing optional and independent links to any other network nodes by merely selecting the frequency of the target node and the spectral efficiency for the required bit rate. A free optically transparent DWDM channel has to be available for the target node, wherein in this scenario each other node is available through 8 DWDM channels with 50 GHz bandwidth for the corresponding 400 GHz AWG frequency channel.

The transmission capacity between the individual nodes can be increased by connecting further receivers or an increase in the bit rate through the adaptive transceivers in wide ranges, e.g. from 1×100 Gbit/s for a spectral efficiency of 2 bit/s/Hz over a DWDM channel up to 8×350 Gbit/s=2.8 Tbit/s for a spectral efficiency of 7 bit/s/Hz over 8 DWDM channels On the receiving side the incoming 96 DWDM channels are switched by wavelength selective switches WSS with a fixed bandwidth of e.g. 50 GHz to the corresponding output fibers and the corresponding adaptive receivers of the transceivers that must be matched to the transmitted adaptive signals of different bit rates. The mapping of the optical frequencies and of the adaptive signals of the transceivers and the WSS components has to be implemented by the network management in the configuration management. For the components and the operation additional management functionalities are necessary, e.g. for monitoring and controlling the optical frequencies for the AWG, the filters, the WSS and the transceiver DWDM channel frequencies. The flexible functionality in this example, too, is provided by the modularization and independence of the components only in the network nodes at the core network edge, such that the core network is not affected or changed.

Example Network Scenario 3 for the Use of Flexible Components at the Core Network Edge An example scenario for the invention for the use of flexible components to the core network edge is shown in FIG. 12.

In the core network with 12 nodes at the core network edge only the passive 12×12 port AWG with a bandwidth of 400 GHz for the transparent optically routed AWG frequency channels 7 and the glass fiber trunks including OLAs connecting the AWG with the individual nodes are located.

One duplex glass fiber connection for the incoming and outgoing optical signals is required for each node.

On the transmission and the receiving side of the nodes adaptive flexible wavelength selective switches aWSS are located which are able to flexibly provide and switch both the bandwidth and the frequency position of the optical channels. Herein, up to M input signals on the M input fibers are switched from the adaptive transmitters of the transceivers to one output fiber and supplied to the AWG in the remote central node.

By means of the 12 network nodes and the 12×12 AWG of the core network the bandwidth of the optically transparent routed AWG frequency channels is 400 GHz, which sets the framework for the optical bandwidths and signals of the flexible adaptive transceivers and WSS.

This allows establishing optional and independent links to any other network nodes by merely selecting the frequency of the target node and the spectral efficiency for the corresponding adaptive bit rate. Herein, merely a free bandwidth in the corresponding 400 GHz wide transparent optical AWG frequency channel has to be available for the target node.

The transmission capacity between the individual nodes can be increased by connecting further adaptive receivers or an increase in the bit rate by the adaptive transceivers in wide ranges, e.g. by spectral efficiencies from 2 bit/s/Hz up to 7 bit/s/Hz over corresponding flexible bandwidths. Herein, the maximum capacity between two nodes is also limited to approximately 400 GHz×7 bit/s/Hz=2.8 Tbit/s.

On the receiving side the incoming flexible optical signals are switched to an adaptive flexible wavelength selective switch aWSS which flexibly switches both the bandwidth and the frequency position of the optical channels to the M output fibers and to the respective adaptive receivers of the transceiver, which have to be matched to the transmitted adaptive signals of different bit rates. Herein, the mapping of the optical frequencies and the adaptive signals of the transceivers and the adaptive aWSS components has to be implemented by the network management in the configuration management. For the components and the operation further management functionalities are necessary, e.g. for monitoring and controlling the optical frequencies for the AWG, the filters, the WSS and the transceiver DWDM channel frequencies. The flexible functionality in this example, too, is provided by the modularization and independence of the components only in the network nodes at the core network edge such that the core network is not affected or changed.

Example Network Scenario 4 for the Use of N×N AWGs in Ring Structures

An example scenario for the invention for the use in ring structures is shown in FIG. 13. Herein 2 redundant N×N AWGs are used in two redundant core network nodes K1,1 and K1,2 for the redundant development of regio, metro (see US 2002/0191250 A1) or access areas used over ring structures. By means of two e.g. 12×12 AWGs in the two network nodes 2 routers R1,1 and R1,2 are respectively connected to the routers R in the access nodes Ax,y, where y corresponds to the respective access node in ring x. Every 12-th node in the access rings is e.g. the respective other core network node, such that both core network nodes can be connected, too. A total of 12 AWG frequency channels with 400 GHz bandwidth are available per fiber for the AWG frequency channels, which, for example, can be used by respectively 8×50 GHz DWDM channels, wherein here passive filter components can be used. This ring structure can connect 2 redundant core network nodes to in total 12×11=132 access nodes via 2×12=24 redundant core network nodes with respectively 11 nodes per ring. The bandwidth provided between a core node and an access node is determined by the bandwidth of the 12×12 port AWG to 400 GHz. This can be used with corresponding spectral efficiencies with e.g. up to 7 bit/s/Hz, so that the bandwidth in a transparent channel may be up to 2.8 Tbit/s. For the ring scenario for a basic configuration with use of each one of the 8 possible 50 GHz wide DWDM channels for connecting all access node to a core network node a redundant network bandwidth of 1×12×50 GHz=6.6 THz is obtained. With 100 Gbit/s transceivers with the spectral efficiency of 2 bit/s/Hz a redundant network capacity of 13.2 Tbit/s is obtained.

For the complete setup with 8×50 GHz DWDM channels the network bandwidth can be increased to 8×6.6 THz=52.8 THz. With 100 Gbit/s transceivers with the spectral efficiency of 2 bit/s/Hz a redundant network capacity of 2×52.8 Tbit/s=105.6 Tbit/s is obtained. This can be increased for transceivers with spectral efficiencies of 7 bit/s/Hz up to 7×52.8 Tbit/s=369.6 Tbit/s.

For the components and the operation management capabilities are necessary e.g. for monitoring and controlling the optical frequencies for the AWG, the filters and the transceiver DWDM channel frequencies. These optical DWDM channel frequencies determine the target node and have to be determined from the configuration management.

Here, the incorporation of flexible adaptive components in the network nodes is possible, too, for example, ROADMs or WSS, such that the invention is not limited to fixed passive components.

Example Network Scenario 5 for the Combined Use of a N×N AWG and a Parallel Connected WSS in a Network Node at the Core Network Edge An example scenario for the invention for the combined use of N×N AWGs and WSS in a network node at the core network edge is shown in FIG. 15 for a N=12 node network. Since the first AWG frequency band having the frequency $f_1$ and the bandwidth B=400 GHz is routed back to the respective output node by the N×N AWG, these frequency bands may be filtered upstream of the AWG by the filters F and be supplied to a 12×12 port WSS (wavelength selected switch) which is arranged parallel to the N×N AWG. These bands can carry up to 8×50 GHz DWDM channels and the WSS can switch these bands optionally to the different output ports which are then fed back through corresponding filters F to the output fibers of the AWG. In this way up to 8×50 GHz channels per network node and thus maximum 12×8=96×50 GHz channels can be switched additionally, in order to provide e.g. additional link capacity requirements between corresponding nodes that exceed the maximum AWG link capacities. Herein, however, blockages are possible only for the WSS, since per node only 8 additional 50 GHz channels for the WSS in the first AWG band can be provided.

The flexible functionality in this example, too is provided by the modularization and independence of the components only in the network nodes at the core network edge, wherein in particular the additional filters for the first AWG band and the WSS are installed in the network node, which is designated as star point, such that the core network also in this case is not affected or changed. The functionality of the WSS is decoupled from the functionality of the N×N AWG and thus independent, too.

Example Network Scenario 6 for the Use of N×N AWGs in Data Centers

An example scenario for the invention for use in data centers is shown in FIG. 16. The TOR-NET concept is used to reduce the hierarchical structures in data centers, wherein multiple switch layers can be reduced to one switch layer. For this purpose the TOR-NET switches are connected on the downlink side in a conventional way e.g. to the servers. On the uplink side the TOR-NET switches according to the present invention set forth are fully meshed optically transparent via one or more optically passive N×N AWGs. For security reasons even here two parallel networks A and B should be provided, such that in case of failure it can be switched from the working path, e.g. in network A, to the protection path, e.g. in network B. All together switch layers can be saved such that capex and opex benefits can be obtained.

Management Use of the Transparent Paths of the Nodes onto Themselves

A fully meshed network requires N×(N−1)/2 bidirectional paths between the N network nodes. By means of the fully meshed frequency shuffle provided by the AWG in total N×N/2 bidirectional paths are provided, which in addition include the paths for the node to themselves. These paths can also be used by the network management, such as for the fault management for monitoring the glass fiber links, in particular also for a proactive management for fault detection in advance of errors occurring, e.g. in case of a temporal degradation of the paths.

Energy Efficiency

Through the use of "colored" optical robust DWDM interfaces in the routers and switches that are positioned in the network nodes, no further transit transceiver are required in the transparent end-to-end DWDM channels. Thus, the number of network components, the energy consumption and therefore also the capex and opex costs are reduced. Simultaneously the energy efficiency and the costs per Gbit/s in the network are minimized.

Capex Reduction

By the reduction of the number of components in the quasi passive optically routed core network and in the network nodes at the core network edge the one-time acquisition costs for the components (capex) will be reduced.

Since in particular a full mesh via a quasi passive optical network is provided, subsequently to the basic set up of the core network with standard single-mode fibers (SSMF) and optical in-line amplifiers (OLA) for further scaling of the network capacity only further transceivers in the nodes are required, if necessary. This need is determined for each individual end-to-end DWDM channel in the fully meshed network by individual monitoring and developed accordingly. Thus, a linear or sublinear scaling of the costs with the capacity requirement can be implemented, since only two further DWDM transceivers and otherwise no further components for a further DWDM channel have to be added or replaced. If a DWDM transceiver pair is replaced by interfaces with higher capacity, then the replaced transceiver pair can be reused elsewhere, whereby the capex cost is reduced.

Opex Reduction

By the reduction of the number of components in the quasi passive optically routed core network and in the network nodes at the core network edge the recurring operating expenses (opex) are effectively reduced, since fewer components need to be managed. For the scalability the transceivers are added in the network nodes only if required, and by monitoring a trend analysis and a timely prediction and planning of the need for an increased capacity per DWDM channel can be performed, such that further opex costs can be reduced.

Migration

The invention or the method can be migrated into an existing network by providing corresponding AWGs at respective central locations in the network and connected to corresponding fibers to the individual nodes. Since the AWG is a passive optical element with corresponding filter characteristics insertion losses and dependencies in the optical frequency domain have to be taken into account.

Overall, after providing the core network infrastructure the individual paths can be set up as desired and independently of one another by equipping the respective transceivers with the intended optical frequencies.

Reduction of the Costs Per Gbit/s (Network Cost Factor) for the Overall Network

By means of the modularization and the associated independence of the network structures and functionalities as well as the advantages set forth, a very cost-effective set up, need-based development and operation of the network are possible, such that the capex and opex costs are minimized and the costs per Gbit/s/km (network cost factor) can be effectively reduced.

Application Fields

In addition to the application of the invention in national and international core networks an application in backbone networks, regional networks, metro networks, access networks as well as in data centers is useful, wherein the described advantages can be incorporated with a corresponding weight. In particular, even ring structures and nested ring structures are possible, to which the invention may be applied.

The invention also includes the precise or exact terms, features, numerical values or ranges, and the like, if above or below these terms, features, numerical values or ranges have been mentioned in association with terms such as "approximately, about, substantially, in general, at least, at the minimum", and the like (i.e., "about 3" is also to mean "3" or "substantially radial" is also to mean "radial"). Moreover, the term "or" means "and/or".

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

TABLE 1

| Port number N | Number of duplex AWG channels node-node | Node-node bandwidth [THz] |
|---|---|---|
| — | — | — |
| — | — | — |
| 3 | 1 | 1600.00 |
| 4 | 1 | 1200.00 |
| 5 | 1 | 960.00 |
| 6 | 1 | 800.00 |
| 7 | 1 | 685.71 |
| 8 | 1 | 600.00 |
| 9 | 1 | 533.33 |
| 10 | 1 | 480.00 |
| 11 | 1 | 436.36 |
| 12 | 1 | 400.00 |
| 13 | 1 | 359.23 |
| 14 | 1 | 342.86 |
| 15 | 1 | 320.00 |
| 16 | 1 | 300.00 |
| 17 | 1 | 282.35 |
| 18 | 1 | 266.67 |
| 19 | 1 | 252.63 |
| 20 | 1 | 240.00 |
| 21 | 1 | 228.57 |
| 22 | 1 | 218.18 |
| 23 | 1 | 208.70 |
| 24 | 1 | 200.00 |
| 25 | 1 | 192.00 |
| 26 | 1 | 184.62 |
| 27 | 1 | 177.78 |
| 28 | 1 | 171.43 |
| 29 | 1 | 165.52 |
| 30 | 1 | 160.00 |
| 31 | 1 | 154.84 |
| 32 | 1 | 150.00 |
| 33 | 1 | 145.45 |
| 34 | 1 | 141.18 |
| 35 | 1 | 137.14 |
| 36 | 1 | 133.33 |
| 37 | 1 | 129.73 |
| 38 | 1 | 126.32 |
| 39 | 1 | 123.08 |
| 40 | 1 | 120.00 |
| 41 | 1 | 117.07 |
| 42 | 1 | 114.29 |
| 43 | 1 | 111.63 |
| 44 | 1 | 109.09 |
| 45 | 1 | 106.67 |
| 46 | 1 | 104.35 |
| 47 | 1 | 102.13 |
| 48 | 1 | 100.00 |
| 49 | 1 | 97.86 |
| 50 | 1 | 96.00 |
| 51 | 1 | 94.12 |
| 52 | 1 | 92.31 |
| 53 | 1 | 90.57 |
| 54 | 1 | 88.89 |
| 55 | 1 | 87.27 |
| 56 | 1 | 85.71 |
| 57 | 1 | 84.21 |
| 58 | 1 | 82.76 |
| 59 | 1 | 81.36 |
| 60 | 1 | 80.00 |
| 61 | 1 | 78.69 |
| 62 | 1 | 77.42 |
| 63 | 1 | 76.19 |
| 64 | 1 | 75.00 |
| 65 | 1 | 73.85 |
| 66 | 1 | 72.73 |
| 67 | 1 | 71.64 |
| 68 | 1 | 70.59 |
| 69 | 1 | 69.97 |
| 70 | 1 | 68.57 |
| 71 | 1 | 67.61 |
| 72 | 1 | 66.67 |
| 73 | 1 | 65.75 |
| 74 | 1 | 64.86 |
| 75 | 1 | 64.00 |
| 76 | 1 | 63.16 |
| 77 | 1 | 62.34 |
| 78 | 1 | 61.54 |
| 79 | 1 | 60.76 |
| 80 | 1 | 60.00 |
| 81 | 1 | 59.25 |
| 82 | 1 | 58.54 |
| 83 | 1 | 57.83 |
| 84 | 1 | 57.14 |
| 85 | 1 | 56.47 |
| 86 | 1 | 55.81 |
| 87 | 1 | 55.17 |
| 88 | 1 | 54.55 |
| 89 | 1 | 53.93 |
| 90 | 1 | 53.33 |
| 91 | 1 | 52.75 |
| 92 | 1 | 52.17 |
| 93 | 1 | 51.61 |
| 94 | 1 | 51.06 |
| 95 | 1 | 50.53 |
| 96 | 1 | 50.00 |

The invention claimed is:

1. A method for a modular optically routed transport network, the method comprising:
   providing a quasi passive Optical Transport Network (OTN) core network according to ITU-T G.709 with N network nodes at the core network edge;
   providing at least one active component in each network node at the core network edge for the transmission of data over the quasi passive OTN core network, wherein the at least one active component in each network node at the core network edge includes a optical transceiver comprising digital signal processors (DSPs) configured to compensate for disturbing influences with respect to glass fiber transmission; and
   changing at least one active component in at least one network node at the core network edge, for scaling the modular optically routed transport network while the quasi passive OTN core network remains substantially unchanged;
   wherein the quasi passive OTN core network comprises: glass fibers, optical in-line amplifiers (OLA)s, and at least one arrayed waveguide grating (AWG);
   wherein the quasi passive OTN core network is configured as a star network, and wherein the at least one AWG is installed in a star point of the star network.

2. The method according to claim 1, wherein the quasi passive OTN core network is configured as a star network with at least one star point located in a network node at the core network edge, a star network with at least one star point located outside the network nodes at the core network edge, or a star network with at least one star point located in a network node at the core network edge and at least one star point located outside the network nodes at the core network edge.

3. The method according to claim 1, wherein a full mesh is established between the network nodes at the core network edge.

4. The method according to claim 1, wherein the at least one AWG is used as a low-loss N×N AWG having an AWG frequency channel bandwidth.

5. The method according to claim 1, wherein the at least one AWG is used as a low-loss N×1 multiplexer and 1×N demultiplexer in dense wavelengt-division multiplexing (DWDM) systems.

6. The method according to claim 1, wherein the at least one AWG is used a low-loss M×1 multiplexer and 1×M demultiplexer in dense wavelength-division multiplexing (DWDM) systems.

7. The method according to claim 1, wherein all optical paths between the network nodes at the core network edge are configured to be supervised independently of each other, monitored independently of each other, or supervised and monitored independently of each other.

8. The method according to claim 1, wherein flexible network components, active network components, or flexible and active network components in the core network are dispensable due to a full mesh configuration of optical end-to-end links.

9. The method according to claim 1, wherein the quasi passive OTN core network is extended by a second, redundant sub-core network.

10. The method according to claim 1, wherein independent or redundant arrayed waveguide gratings (AWGs) are provided in the quasi passive OTN core network.

11. The method according to claim 1, wherein passive components, active optical components, or electric components, or a combination thereof, re provided in a network node at the core network edge.

12. A network system having a modular construction, comprising:
   a quasi passive Optical Transport Network (OTN) core network with N network nodes at the core network edge; and
   at least one transceiver in each network node at the core network edge comprising digital signal processors (DSPs) configured to compensate for disturbing influences with respect to glass fiber transmission;
   wherein the network system is scalable by changing or replacing components in the network nodes at the core network edge while the quasi passive OTN core network is substantially unchanged;
   wherein the quasi passive OTN core network comprises at least one of the following passive optical components: glass fibers, optical in-line amplifiers (OLAs), and at least one arrayed waveguide grating (AWG);
   wherein the quasi passive OTN core network is configured as a star network, and wherein the at least one AWG is installed in a star point of the star network.

13. The network system according to claim 12, wherein the quasi passive OTN core network is configured as a star network with at least one star point located in a network node at the core network edge, a star network with at least one star point located outside the network nodes at the core network edge, or a star network with at least one star point located in a network node at the core network edge and at least one star point located outside the network nodes at the core network edge.

14. The network system according to claim 12, wherein the at least one AWG includes a low-loss N×N AWG having an AWG frequency channel bandwidth.

15. The network system according to claim 12, wherein the network nodes comprise passive components, active optical components, or electric components, or a combination thereof.

16. A method for a modular optically routed transport network, the method comprising:
   providing a quasi passive Optical Transport Network (OTN) core network according to ITU-T G.709 with N network nodes at the core network edge;
   providing at least one active component in each network node at the core network edge for the transmission of data over the quasi passive OTN core network, wherein the at least one active component in each network node at the core network edge includes an optical transceiver comprising digital signal processors (DSPs) configured to compensate for disturbing influences with respect to glass fiber transmission; and
   changing at least one active component in at least one network node at the core network edge, for scaling the modular optically routed transport network while the quasi passive OTN core network remains substantially unchanged;
   wherein all optical paths between the network nodes at the core network edge are configured to be supervised independently of each other, monitored independently of each other, or supervised and monitored independently of each other.

17. A method for a modular optically routed transport network, the method comprising:
   providing a quasi passive Optical Transport Network (TN) core network according to ITU-T G.709 with N network nodes at the core network edge;
   providing at least one active component in each network node at the core network edge for the transmission of data over the quasi passive OTN core network, wherein the at least one active component in each network node at the core network edge includes an optical transceiver comprising digital signal processors (DSPs) configured to compensate for disturbing influences with respect to glass fiber transmission; and changing at least one active component in at least one network node at the core network edge, for scaling the modular optically routed transport network while the quasi passive OTN core network remains substantially unchanged;

wherein the quasi passive OTN core network is extended by a second, redundant sub-core network.

* * * * *